United States Patent
Niimoto et al.

(10) Patent No.: US 11,254,823 B2
(45) Date of Patent: Feb. 22, 2022

(54) ANTIFOULING COATING MATERIAL COMPOSITION, ANTIFOULING COATING FILM, SUBSTRATE PROVIDED WITH ANTIFOULING COATING FILM AND PRODUCTION METHOD THEREFOR, AND ANTIFOULING METHOD

(71) Applicant: CHUGOKU MARINE PAINTS, LTD., Otake (JP)

(72) Inventors: Jyunji Niimoto, Otake (JP); Yusuke Hayashi, Otake (JP); Satoshi Masuda, Otake (JP); Hideyuki Tanaka, Otake (JP)

(73) Assignee: CHUGOKU MARINE PAINTS, LTD., Otake (JP)

( * ) Notice: Subject to any disclaimer, the term of this patent is extended or adjusted under 35 U.S.C. 154(b) by 35 days.

(21) Appl. No.: 16/312,597

(22) PCT Filed: Nov. 15, 2016

(86) PCT No.: PCT/JP2016/083813
§ 371 (c)(1),
(2) Date: Dec. 21, 2018

(87) PCT Pub. No.: WO2018/003135
PCT Pub. Date: Jan. 4, 2018

(65) Prior Publication Data
US 2019/0330479 A1   Oct. 31, 2019

(30) Foreign Application Priority Data

Jul. 1, 2016   (JP) .............................. JP2016-131989

(51) Int. Cl.
*C09D 5/16* (2006.01)
*C09D 7/45* (2018.01)
(Continued)

(52) U.S. Cl.
CPC ............ *C09D 5/1662* (2013.01); *B63B 35/52* (2013.01); *C08K 3/013* (2018.01); *C08K 5/0016* (2013.01);
(Continued)

(58) Field of Classification Search
CPC ...... C09D 5/16; C09D 5/1606; C09D 5/1612; C09D 5/1618; C09D 5/1625;
(Continued)

(56) References Cited

U.S. PATENT DOCUMENTS

2006/0201379 A1   9/2006   Nyden et al.
2008/0249078 A1   10/2008   Nyden et al.
(Continued)

FOREIGN PATENT DOCUMENTS

EP   2 204 423 A1   7/2010
EP   2 551 309 A1   1/2013
(Continued)

OTHER PUBLICATIONS

Extended European Search Report dated Feb. 6, 2020 in European Patent Application No. 16907368.1, 7 pages.
(Continued)

*Primary Examiner* — Kregg T Brooks
(74) *Attorney, Agent, or Firm* — Oblon, McClelland, Maier & Neustadt, L.L.P.

(57) ABSTRACT

An object of the present invention is to provide an antifouling coating composition capable of forming an antifouling coating film that retains a high antifouling performance for a prolonged period of time and has an excellent damage resistance. Another object of the present invention is to provide an antifouling coating film formed with the antifouling coating composition, a substrate with an antifouling coating film and a method for producing the same, and an antifouling method using the antifouling coating film. The
(Continued)

antifouling coating composition of the present invention contains a hydrolyzable polymer (A) containing a metal ester group, zinc oxide (B), and medetomidine (C), and has a content of the zinc oxide (B) in a solid content of the antifouling composition of 27 to 60% by mass.

13 Claims, 1 Drawing Sheet

(51) Int. Cl.
| | |
|---|---|
| *C08K 3/013* | (2018.01) |
| *B63B 35/52* | (2006.01) |
| *C08K 5/00* | (2006.01) |
| *C08K 5/3472* | (2006.01) |
| *C08K 5/56* | (2006.01) |
| *C09D 5/02* | (2006.01) |
| *C09D 133/02* | (2006.01) |
| *C09D 133/04* | (2006.01) |
| *C08K 3/22* | (2006.01) |

(52) U.S. Cl.
CPC ............ *C08K 5/3472* (2013.01); *C08K 5/56* (2013.01); *C09D 5/027* (2013.01); *C09D 5/1625* (2013.01); *C09D 7/45* (2018.01); *C09D 133/02* (2013.01); *C09D 133/04* (2013.01); *C08K 2003/2248* (2013.01); *C08K 2003/2296* (2013.01); *C09D 5/1687* (2013.01)

(58) Field of Classification Search
CPC .... C09D 5/1637; C09D 5/165; C09D 5/1656; C09D 5/1662; C09D 5/1668; C09D 133/02; C09D 133/04; C08K 5/3445; C08K 2003/2296
See application file for complete search history.

(56) References Cited

U.S. PATENT DOCUMENTS

| | | |
|---|---|---|
| 2009/0270357 A1 | 10/2009 | Nyden et al. |
| 2013/0045264 A1 | 2/2013 | Masuda et al. |
| 2014/0315030 A1 | 10/2014 | Niimoto et al. |
| 2016/0168392 A1* | 6/2016 | Masuda ................. C09D 5/165 |
| | | 424/78.09 |
| 2018/0201797 A1 | 7/2018 | Taniguchi et al. |

FOREIGN PATENT DOCUMENTS

| | | |
|---|---|---|
| EP | 3 354 667 A1 | 8/2018 |
| JP | 2001-72869 A | 3/2001 |
| JP | 2008-156511 A | 7/2008 |
| JP | 2008-533237 A | 8/2008 |
| JP | 2011-26357 A | 2/2011 |
| JP | 2016-501951 A | 1/2016 |
| WO | WO 2007/015676 A1 | 2/2007 |
| WO | WO 2011/118526 A1 | 9/2011 |
| WO | WO 2013/073580 A1 | 5/2013 |
| WO | WO 2014/175246 A1 | 10/2014 |
| WO | WO-2014189069 A1 * | 11/2014 ........... C09D 133/08 |

OTHER PUBLICATIONS

International Search Report dated Dec. 27, 2016 in PCT/JP2016/083813 filed on Nov. 15, 2016.
Japanese Office Action dated Aug. 27, 2019, in Patent Application No. 2018-524860, 2 pages.

* cited by examiner

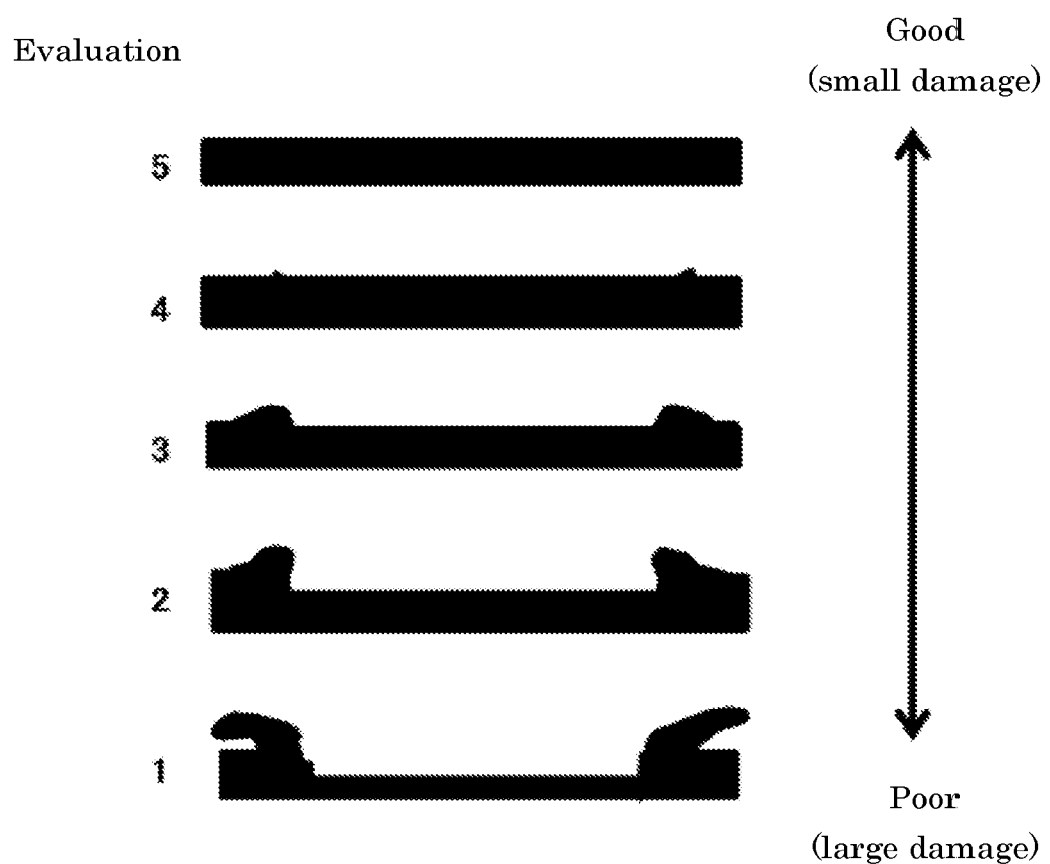

ANTIFOULING COATING MATERIAL COMPOSITION, ANTIFOULING COATING FILM, SUBSTRATE PROVIDED WITH ANTIFOULING COATING FILM AND PRODUCTION METHOD THEREFOR, AND ANTIFOULING METHOD

TECHNICAL FIELD

The present invention relates to an antifouling coating composition, and an antifouling coating film, a substrate with an antifouling coating film and a method for producing the substrate, and an antifouling method, each using the composition.

BACKGROUND ART

As for substrates of ships, underwater structures, fishing gears, such as a fishing net, and the like, various aquatic organisms including animals, such as oysters, mussels, and barnacles, plants, such as seaweed, and bacteria, tend to adhere to the surface of the substrate exposed to water for a prolonged period of time, and furthermore the fouling environment thereof is becoming severe due to the increase in activity of the aquatic organisms caused by the rise of the seawater temperature associated with the global warming in recent years. In the case where a hydrolyzable antifouling paint is used, it is the current situation that the coating film necessarily has an increased consumption property to increase the elution amount of the antifouling active agent, which makes the long-term performance retention difficult, and consequently the number of maintenance by repainting is increased to increase the economic load. Furthermore, there is an increasing tendency that the docking interval of large-scale ocean-going tankers or the like becomes five years or more, for which the film thickness of the antifouling coating film is increased to retain the performance thereof for a prolonged period of time, but there are large issues including the improvement of the damage characteristics of the coating film with the increased film thickness, and the retention of the high antifouling performance for a prolonged period of time.

For example, PTL 1 describes an antifouling coating composition containing a metal bond-containing copolymer or a silyl ester copolymer and medetomidine.

PTL 2 describes a technique relating to a method for preventing adhesion of ocean organisms using a combination of a substance having an impact to the nerve signal transmission in cypris larvae of barnacles, which is selected from the group consisting of medetomidine and spiroimidazoline, and an algal inhibitor.

PTL 3 describes an antifouling coating composition containing a metal salt bond-containing copolymer, 4,5-dichloro-2-n-octyl-4-isothiazolon-3-one, zinc 2-pyridinethiol-1-oxide, and titanium oxide.

CITATION LIST

Patent Literatures

PTL 1: WO 2011/118526
PTL 2: WO 2007/015676
PTL 3: JP 2008-156511 A

SUMMARY OF INVENTION

Technical Problem

The antifouling coating compositions described in the patent literatures have room of improvement for retaining the high antifouling performance for a prolonged period of time.

PTL 1 describes the technique exhibiting an excellent static antifouling performance by the combination of a hydrolyzable resin, such as a metal bond-containing copolymer or a silyl ester copolymer, and medetomidine, and PTL 2 describes excellent adhesion prevention of ocean organisms by the combination use of medetomidine and an algal inhibitor, but these do not relate to a technique for exhibiting a high antifouling performance for a further prolonged period of time.

PTL 3 describes the technique relating to an antifouling paint having an excellent antifouling performance while suppressing the consumption degree of the coating film, but there is room of improvement in retention of an excellent antifouling performance for a further prolonged period of time although the static antifouling performance can be retained for approximately six months.

An object of the present invention is to provide an antifouling coating composition capable of forming an antifouling coating film that retains a high antifouling performance for a prolonged period of time and has an excellent damage resistance. Another object of the present invention is to provide an antifouling coating film formed with the antifouling coating composition, a substrate with an antifouling coating film and a method for producing the same, and an antifouling method using the antifouling coating film.

Solution to Problem

As a result of the earnest investigations made by the present inventors, it has been found that the use of the antifouling coating composition shown below can solve the problem, and thus the present invention has been completed.

The gist of the present invention is as follows.

The present invention relates to the following items [1] to [17].

[1] An antifouling coating composition containing:
a hydrolyzable polymer (A) containing a metal ester group,
zinc oxide (B), and
medetomidine (C); and
having a content of the zinc oxide (B) in a solid content of the antifouling coating composition of from 27 to 60% by mass, preferably from 27 to 58% by mass, and more preferably from 27 to 55% by mass.

[2] The antifouling coating composition according to the item [1], wherein the metal ester group is represented by the following formula (1).

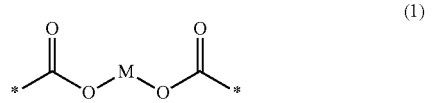

In the formula (1), M represents copper or zinc, and preferably zinc; and * represents a bonding site.

[3] The antifouling coating composition according to the item [1] or [2], wherein the hydrolyzable polymer (A)

contains at least one selected from the group consisting of a polymer (A1) having a constituent unit derived from a polymerizable compound represented by the following formula (1-1) and a polymer (A2) having a constituent unit derived from a polymerizable compound represented by the following formula (1-2).

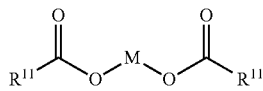
(1-1)

In the formula (1-1), $R^{11}$ each independently represent a monovalent group containing a terminal ethylenically unsaturated group, preferably a group resulting from removal of a carboxy group from an aliphatic unsaturated monocarboxylic acid containing a terminal ethylenically unsaturated group, or a group resulting from removal of one carboxy group from an aliphatic unsaturated dicarboxylic acid containing a terminal ethylenically unsaturated group, more preferably a group resulting from removal of a carboxy group from an aliphatic unsaturated monocarboxylic acid containing a terminal ethylenically unsaturated group, and further preferably a group resulting from removal of a carboxy group from acrylic acid, methacrylic acid, or (meth)acryloyloxyalkylcarboxylic acid; and M represents copper or zinc, and preferably zinc.

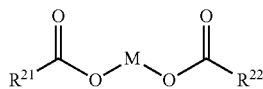
(1-2)

In the formula (1-2), $R^{21}$ represents a monovalent group containing a terminal ethylenically unsaturated group, preferably a group resulting from removal of carboxy group from an aliphatic unsaturated monocarboxylic acid containing a terminal ethylenically unsaturated group, or a group resulting from removal of one carboxy group from an aliphatic unsaturated dicarboxylic acid containing a terminal ethylenically unsaturated group, more preferably a group resulting from removal of a carboxy group from an aliphatic unsaturated monocarboxylic acid containing a terminal ethylenically unsaturated group, and further preferably a group resulting from removal of a carboxy group from acrylic acid, methacrylic acid, or (meth)acryloyloxyalkylcarboxylic acid; $R^{22}$ represents a monovalent organic group having 1 to 30 carbon atoms containing no terminal ethylenically unsaturated group, preferably an organic acid residual group formed from a monobasic acid, more preferably a group resulting from removal of a carboxy group from an organic acid selected from the group consisting of versatic acid, palmitic acid, stearic acid, isostearic acid, oleic acid, linoleic acid, linolenic acid, abietic acid, neoabietic acid, pimaric acid, dihydroabietic acid, 12-hydroxystearic acid, and naphthenic acid, further preferably a group resulting from removal of a carboxy group from abietic acid, versatic acid, or naphthenic acid, and still further preferably a group resulting from removal of a carboxy group from abietic acid or versatic acid; and M represents copper or zinc, and preferably zinc.

[4] The antifouling coating composition according to any one of the items [1] to [3], wherein the hydrolyzable polymer (A) contains at least one selected from the group consisting of a polymer (A1') having a constituent unit derived from a polymerizable compound represented by the following formula (1-1') and a polymer (A2') having a constituent unit derived from a polymerizable compound represented by the following formula (1-2').

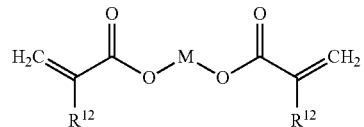
(1-1')

In the formula (1-1'), $R^{12}$ each independently represent a hydrogen atom or a methyl group; and M represents copper or zinc, and preferably zinc.

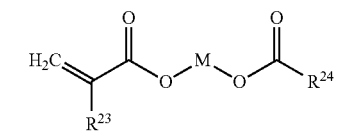
(1-2')

In the formula (1-2'), $R^{23}$ represents a hydrogen atom or a methyl group; $R^{24}$ represents a monovalent organic group having 1 to 30 carbon atoms containing no terminal ethylenically unsaturated group, preferably an organic acid residual group formed from a monobasic acid, more preferably a group resulting from removal of a carboxy group from an organic acid selected from the group consisting of versatic acid, palmitic acid, stearic acid, isostearic acid, oleic acid, linoleic acid, linolenic acid, abietic acid, neoabietic acid, pimaric acid, dihydroabietic acid, 12-hydroxystearic acid, and naphthenic acid, further preferably a group resulting from removal of a carboxy group from abietic acid, versatic acid, or naphthenic acid, and still further preferably a group resulting from removal of a carboxy group from abietic acid or versatic acid; and M represents copper or zinc, and preferably zinc.

[5] The antifouling coating composition according to the item [3] or [4], wherein the hydrolyzable polymer (A) has a total content of the constituent units derived from the polymerizable compound represented by the formula (1-1), the polymerizable compound represented by the formula (1-1'), the polymerizable compound represented by the formula (1-2), and the polymerizable compound represented by the formula (1-2') of from 1 to 60% by mass, preferably from 5 to 40% by mass, and more preferably from 10 to 30% by mass, based on the total constituent units.

[6] The antifouling coating composition according to any one of the items [1] to [5], which has a content of the hydrolyzable polymer (A) in a solid content of the antifouling coating composition of from 1 to 50% by mass, preferably from 3 to 40% by mass, and more preferably from 5 to 35% by mass.

[7] The antifouling coating composition according to any one of the items [1] to [6], which has a content of the medetomidine (C) in a solid content of the antifouling coating composition of from 0.01 to 30% by mass, preferably from 0.015 to 25% by mass, more preferably from 0.02 to 20% by mass, and further preferably from 0.05 to 2% by mass.

[8] The antifouling coating composition according to any one of the items [1] to [7], wherein the antifouling coating composition contains at least one selected from the group consisting of a copper pyrithione and a zinc pyrithione as an organic antifouling agent (D).

[9] The antifouling coating composition according to any one of the items [1] to [8], which has a content of the organic antifouling agent (D) in a solid content of the antifouling coating composition of from 1 to 50% by mass, preferably from 1.5 to 45% by mass, and more preferably from 2 to 40% by mass.

[10] The antifouling coating composition according to any one of the items [1] to [9], which has a content of cuprous oxide (E) in a solid content of the antifouling coating composition of 10% by mass or less, preferably 5% by mass or less, more preferably 1% by mass or less, and further preferably 0.5% by mass or less, and still further preferably has substantially no cuprous oxide (E) contained.

[11] The antifouling coating composition according to any one of the items [1] to [10], further containing at least one selected from the group consisting of a monocarboxylic acid compound (F) and/or a metal ester thereof, an inorganic copper compound (G) except for cuprous oxide, an organic antifouling agent except for a copper pyrithione and a zinc pyrithione as an organic antifouling agent (D), a coloring pigment (H), an extender pigment (I), a pigment dispersant (J), a plasticizer (K), an anti-sagging agent (L), an anti-settling agent (M), a dehydrating agent (N), a solvent (O), and the other resin (P).

[12] An antifouling coating film, which is formed with the antifouling coating composition according to any one of the items [1] to [11].

[13] A substrate with an antifouling coating film, the substrate being coated with the antifouling coating film according to the item [12].

[14] The substrate with an antifouling coating film according to the item [13], wherein the substrate is selected from the group consisting of a ship, an underwater structure, and a fishing gear.

[15] A method for producing a substrate with an antifouling coating film, including: (I) a step of providing an applied material or an impregnated material by applying the antifouling coating composition according to any one of the items [1] to [11] on a substrate or impregnating a substrate with the antifouling coating composition according to any one of the items [1] to [11]; and (II) a step of drying the applied material or the impregnated material.

[16] A method for producing a substrate with an antifouling coating film, including: (i) a step of forming an antifouling coating film by drying the antifouling coating composition according to any one of the items [1] to [11]; and (ii) a step of attaching the antifouling coating film to a substrate.

[17] An antifouling method using the antifouling coating film according to the item [12].

Advantageous Effects of Invention

According to the present invention, an antifouling coating composition capable of forming an antifouling coating film that retains a high antifouling performance for a prolonged period of time and has an excellent damage resistance can be provided. According to the present invention, furthermore, an antifouling coating film formed with the antifouling coating composition, a substrate with an antifouling coating film and a method for producing the same, and an antifouling method using the antifouling coating film can be provided.

BRIEF DESCRIPTION OF THE DRAWING

FIG. 1 is a schematic illustration of cross sectional views of coating films for each grade of the evaluation of damage resistance in the examples.

DESCRIPTION OF EMBODIMENTS

The antifouling coating composition, the antifouling coating film, the substrate with an antifouling coating film and the method for producing the same, and the antifouling method according to the present invention will be described in detail below.

In the description herein, the "(meth)acrylic acid" and the "(meth)acrylate" mean "acrylic acid or methacrylic acid" and "acrylate or methacrylate" respectively.

[Antifouling Coating Composition]

The antifouling coating composition (which may be hereinafter referred simply to as a "coating composition") of the present invention contains a hydrolyzable polymer (A) containing a metal ester group, zinc oxide (B), and medetomidine (C), and has a content of the zinc oxide (B) in the solid content thereof of 27 to 60% by mass.

According to the present invention, an antifouling coating composition capable of forming an antifouling coating film that retains a high antifouling performance against aquatic organisms for a prolonged period of time and has an excellent damage resistance can be provided.

The antifouling coating compositions described in PTLs 1 to 3 have a tendency of decrease of the antifouling performance, which is considered to be caused mainly by elution of the organic antifouling agent, and are difficult to retain the antifouling performance for a prolonged period of time. Furthermore, due to the insufficient damage resistance thereof, there is an inexpedience that the antifouling coating film is damaged particularly in the case where the antifouling coating film is formed as a thick film, and as a result, the antifouling performance cannot be exhibited for a prolonged period of time. It has been found that the antifouling coating composition of the present invention contains a hydrolyzable polymer (A) containing a metal ester group, zinc oxide (B), and medetomidine (C), and has a content of the zinc oxide (B) in the solid content thereof of 27 to 60% by mass, and thereby an antifouling coating composition capable of forming an antifouling coating film that retains a high antifouling performance for a prolonged period of time and has an excellent damage resistance can be provided.

While the functional mechanism of the aforementioned effects is not necessarily clear, a part thereof can be estimated as follows. Specifically, it is considered that the antifouling coating film is imparted with appropriate water resistance and renewability from the surface thereof in water by containing the hydrolyzable polymer (A) containing a metal ester group, and furthermore with the particular amount of the zinc oxide (B) and the medetomidine (C) contained, an antifouling coating film that retains the antifouling performance for a further prolonged period of time and has an excellent damage resistance can be obtained through the mutual interaction in the antifouling coating film.

The components contained in the antifouling coating composition of the present invention will be described in detail below.

<Hydrolyzable Polymer (A) Containing Metal Ester Group>

The antifouling coating composition of the present invention contains the hydrolyzable polymer (A) containing a metal ester group (which may be hereinafter referred simply to as a "hydrolyzable polymer (A)").

The "metal ester group" referred herein means a salt formed with a metal and an organic acid, and is preferably a group formed by bonding a metal and a carboxylic acid. The "polyvalent metal ester group" or the "divalent metal ester group" described later means a group formed by combining a polyvalent metal or a divalent metal and an organic acid.

The metal ester group is preferably a polyvalent metal ester group, and more preferably a divalent metal ester represented by the following formula (1).

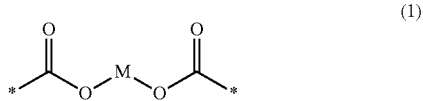

(1)

In the formula (1), M represents a metal; and * represents a bonding site.

Examples of the metal constituting the metal ester group include magnesium, calcium, neodymium, titanium, zirconium, iron, ruthenium, cobalt, nickel, copper, zinc, and aluminum.

In the formula (1), M represents a divalent metal, and a divalent metal may be selected from the aforementioned metals and used therefor. Among these, Groups 10 to 12 metals, such as nickel, copper, and zinc, are preferred, copper and zinc are more preferred, and zinc is further preferred.

In the formula (1), * represents a bonding site, which shows bonding to an arbitrary group, preferably an arbitrary organic group.

The hydrolyzable polymer (A) may have the group represented by the formula (1) on the main chain or the end of the side chain thereof, and the main chains thereof may be crosslinked through a divalent group containing the group represented by the formula (1). The hydrolyzable polymer (A) may be an addition polymerization type polymer obtained through polymerization of an ethylenic unsaturated compound, or may be a polycondensation type polymer obtained through polycondensation, such as a polyester and a polyamide, with no particular limitation. Among these, an addition polymerization type polymer obtained through polymerization of an ethylenic unsaturated compound is preferred.

The hydrolyzable polymer (A) preferably contains at least one selected from the group consisting of a polymer (A1) having a constituent unit derived from a polymerizable compound represented by the following formula (1-1) and a polymer (A2) having a constituent unit derived from a polymerizable compound represented by the following formula (1-2). The hydrolyzable polymer (A) may have both a constituent unit derived from a polymerizable compound represented by the following formula (1-1) and a constituent unit derived from a polymerizable compound represented by the following formula (1-2), and this case is designated as the polymer (A1). Consequently, the polymer (A1) is a polymer that contains at least a constituent unit derived from a polymerizable compound represented by the following formula (1-1), and the polymer (A2) is a polymer that contains a constituent unit derived from a polymerizable compound represented by the following formula (1-2), but does not contain a constituent unit derived from a polymerizable compound represented by the following formula (1-1).

In the case where the hydrolyzable polymer (A) is the polymer (A1) having a constituent unit derived from a polymerizable compound represented by the following formula (1-1), the polymerizable compound represented by the following formula (1-1) may be used as a monomer component, or the polymer (A1) may be obtained by providing a polymer having a carboxy group and then metal-esterifying the polymer to form a crosslinked structure, with no particular limitation, and the polymer (A1) is preferably obtained by using the polymerizable compound represented by the following formula (1-1) as a monomer component from the standpoint of the easiness in production.

Similarly, the polymer (A2) having a constituent unit derived from a polymerizable compound represented by the following formula (1-2) may be obtained by using the polymerizable compound represented by the following formula (1-2) as a monomer component, may be obtained by providing a polymer having a carboxy group and then metal-esterifying the polymer, with no particular limitation, and the polymer (A2) is preferably obtained by using the polymerizable compound represented by the following formula (1-2) as a monomer component from the standpoint of the easiness in production.

In the following description, the polymerizable compound represented by the following formula (1-1) may be referred to as a monomer (a1-1), and the polymerizable compound represented by the following formula (1-2) may be referred to as a monomer (a1-2). The monomer (a1-1) and the monomer (a1-2) may be collectively referred to as a monomer (a1).

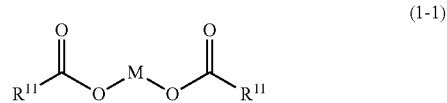

(1-1)

In the formula (1-1), $R^{11}$ each independently represent a monovalent group containing a terminal ethylenically unsaturated group; and M represents copper or zinc.

In the formula (1-1), $R^{11}$ each independently represent a monovalent group containing a terminal ethylenically unsaturated group ($CH_2$=C<), and the number of carbon atoms of $R^{11}$ is preferably from 2 to 50, more preferably from 2 to 30, further preferably from 2 to 10, and still further preferably from 2 to 6. $R^{11}$ suffices to have a terminal ethylenically unsaturated group, may have an ethylenically unsaturated group at a position other than the terminal, and preferably has an ethylenically unsaturated group only at the terminal.

$R^{11}$ preferably represents an unsaturated aliphatic group containing a terminal ethylenically unsaturated group, and the unsaturated aliphatic group may have an ester bond, an amide bond, and an ether bond in the carbon chain thereof. Examples of $R^{11}$ include a group resulting from removal of a carboxy group from an aliphatic unsaturated monocarboxylic acid containing a terminal ethylenically unsaturated group, such as an acrylic acid (2-propenoic acid), methacrylic acid (2-methyl-2-propenoic acid), 3-butenoic acid, 4-pentenoic acid, 10-undecenoic acid, 3-(meth)acryloyloxypropionic acid, and 3-(meth)acryloyloxy-2-methylpropionic acid. Examples thereof also include a group resulting from removal of one carboxy group from an aliphatic unsaturated dicarboxylic acid containing a terminal ethylenically unsaturated group, such as itaconic acid.

Among these, $R^{11}$ preferably represents a group resulting from removal of a carboxy group from an aliphatic unsaturated monocarboxylic acid containing a terminal ethylenically unsaturated group, more preferably a group resulting from removal of a carboxy group from acrylic acid, methacrylic acid, or (meth)acryloyloxyalkylcarboxylic acid, and further preferably a group resulting from removal of a carboxy group from acrylic acid or methacrylic acid.

Examples of the polymerizable compound represented by the formula (1-1) (i.e., the monomer (a1-1)) include zinc diacrylate, zinc dimethacrylate, zinc acrylate methacrylate, zinc di(3-acryloyloxypropionate), zinc di(3-methacryloyloxypropionate), zinc di(3-(meth)acryloyloxy-2-methylpropionate), copper diacrylate, copper dimethacrylate, copper acrylate methacrylate, copper di(3-acryloyloxypropionate), copper di(3-methacryloyloxypropionate), and copper di(3-(meth)acryloyloxy-2-methylpropionate).

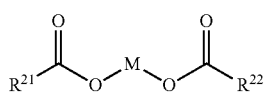

(1-2)

In the formula (1-2), $R^{21}$ represents a monovalent group containing a terminal ethylenically unsaturated group; $R^{22}$ represents a monovalent organic group having 1 to 30 carbon atoms containing no terminal ethylenically unsaturated group; and M represents copper or zinc.

In the formula (1-2), $R^{21}$ represents a monovalent group containing a terminal ethylenically unsaturated group. Examples of $R^{21}$ include the same groups as for $R^{11}$ in the formula (1-1), and the preferred embodiments thereof are also the same.

In the formula (1-2), $R^{22}$ represents a monovalent organic group having 1 to 30 carbon atoms containing no terminal ethylenically unsaturated group. Examples of $R^{22}$ include an aliphatic hydrocarbon group having 1 to 30 carbon atoms, an alicyclic hydrocarbon group having 3 to 30 carbon atoms, and an aromatic hydrocarbon group having 6 to 30 carbon atoms that contain no terminal ethylenically unsaturated group. These groups may have a substituent. Examples of the substituent include a hydroxy group.

The aliphatic hydrocarbon group may be any of straight-chain and branched chain, and may be any of a saturated aliphatic hydrocarbon group and an unsaturated aliphatic hydrocarbon group. In the case where $R^{22}$ represents an unsaturated aliphatic hydrocarbon group, $R^{22}$ contains no terminal ethylenically unsaturated group. The number of carbon atoms of the aliphatic hydrocarbon group is from 1 to 30, preferably from 1 to 28, more preferably from 1 to 26, and further preferably from 1 to 24. The aliphatic hydrocarbon group may be further substituted by an alicyclic hydrocarbon group and an aromatic hydrocarbon group.

The alicyclic hydrocarbon group may be any of a saturated alicyclic hydrocarbon group and an unsaturated alicyclic hydrocarbon group. The number of carbon atoms of the alicyclic hydrocarbon group is from 3 to 30, preferably from 4 to 20, more preferably from 5 to 16, and further preferably from 6 to 12. The alicyclic hydrocarbon group may be further substituted by an aliphatic hydrocarbon group and an aromatic hydrocarbon group.

The number of carbon atoms of the aromatic hydrocarbon group is from 6 to 30, preferably from 6 to 24, more preferably from 6 to 18, and further preferably from 6 to 10. The aromatic hydrocarbon group may be further substituted by an aliphatic hydrocarbon group and an alicyclic hydrocarbon group.

$R^{22}$ preferably represents an organic acid residual group formed from a monobasic acid, and examples thereof include a group resulting from removal of a carboxy group from an organic acid selected from the group consisting of versatic acid, palmitic acid, stearic acid, isostearic acid, oleic acid, linoleic acid, linolenic acid, abietic acid, neoabietic acid, pimaric acid, dihydroabietic acid, 12-hydroxystearic acid, and naphthenic acid.

Among these, a group resulting from removal of a carboxy group from abietic acid, versatic acid, or naphthenic acid is preferred, and a group resulting from removal of a carboxy group from abietic acid or versatic acid is more preferred.

The polymer (A2) having a constituent unit derived from the polymerizable compound represented by the formula (1-2) preferably contains a constituent unit obtained through polymerization of only the terminal ethylenically unsaturated group in the polymerizable compound represented by the formula (1-2) (i.e., the monomer (a1-2)). Examples of the monomer (a1-2) include a polymerizable compound selected from the group consisting of zinc 3-(meth)acryloyloxypropionate abietate, zinc 3-(meth)acryloyloxypropionate versatate, zinc (meth)acrylate abietate, zinc (meth)acrylate versatate, zinc (meth)acrylate naphthenate, copper 3-(meth)acryloyloxypropionate abietate, copper 3-(meth)acryloyloxypropionate versatate, copper (meth)acrylate abietate, copper (meth)acrylate versatate, and copper (meth)acrylate naphthenate.

In the formulae (1-1) and (1-2), M represents zinc or copper, and preferably zinc.

The hydrolyzable polymer (A) more preferably contains at least one selected from the group consisting of a polymer (A1') having a constituent unit derived from a polymerizable compound represented by the following formula (1-1') and a polymer (A2') having a constituent unit derived from a polymerizable compound represented by the following formula (1-2'). The polymer (A1) is preferably the polymer (A1'), and the polymer (A2) is preferably the polymer (A2'). The hydrolyzable polymer (A) may have both a constituent unit derived from a polymerizable compound represented by the following formula (1-1') and a constituent unit derived from a polymerizable compound represented by the following formula (1-2').

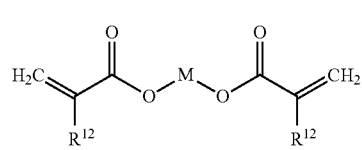

(1-1')

In the formula (1-1'), $R^{12}$ each independently represent a hydrogen atom or a methyl group; and M represents copper or zinc.

Examples of the polymerizable compound represented by the formula (1-1') include zinc diacrylate, zinc dimethacrylate, zinc acrylate methacrylate, copper diacrylate, copper dimethacrylate, and copper acrylate methacrylate.

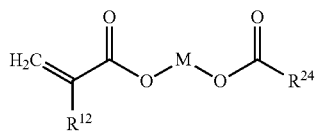

In the formula (1-2'), $R^{23}$ represents a hydrogen atom or a methyl group; $R^{24}$ represents a monovalent organic group having 1 to 30 carbon atoms containing no terminal ethylenically unsaturated group; and M represents copper or zinc.

In the formula (1-2'), examples of $R^{24}$ include the same groups as for $R^{22}$ in the formula (1-2), and the preferred embodiments thereof are also the same.

Examples of the polymerizable compound represented by the formula (1-2') include zinc (meth)acrylate abietate, zinc (meth)acrylate versatate, zinc (meth)acrylate naphthenate, copper (meth)acrylate abietate, copper (meth)acrylate versatate, and copper (meth)acrylate naphthenate.

In the formulae (1-1') and (1-2'), M represents zinc or copper, and preferably zinc.

The hydrolyzable polymer (A) preferably has a total content of the constituent units derived from the polymerizable compound represented by the formula (1-1), the polymerizable compound represented by the formula (1-1'), the polymerizable compound represented by the formula (1-2), and the polymerizable compound represented by the formula (1-2'), i.e., a total content of the constituent unit derived from the monomer (a1), of from 1 to 60% by mass, more preferably from 5 to 40% by mass, and further preferably from 10 to 30% by mass, based on the total constituent units.

The proportions of the contents (masses) of the constituent units derived from the monomers in the hydrolyzable polymer (A) can be assumed to be the same as the proportions of the charged amounts (masses) of the monomers used for the polymerization reaction.

The hydrolyzable polymer (A) preferably has a constituent unit derived from the other monomer (a2) than the constituent unit having a metal ester group.

The other monomer (a2) is preferably a monomer having an ethylenic unsaturated group, and examples thereof include:

an alkyl (meth)acrylate or an aryl (meth)acrylate, such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, pentyl (meth)acrylate, hexyl (meth)acrylate, cyclohexyl (meth)acrylate, n-octyl (meth)acrylate, isooctyl (meth)acrylate, 2-ethylhexyl (meth)acrylate, 3,5,5-trimethylhexyl (meth)acrylate, lauryl (meth)acrylate, cetyl (meth)acrylate, stearyl (meth)acrylate, phenyl (meth)acrylate, and benzyl (meth)acrylate;

an alkoxyalkyl (meth)acrylate, such as 2-methoxyethyl (meth)acrylate, 2-ethoxyethyl (meth)acrylate, 3-methoxybutyl (meth)acrylate, 4-methoxybutyl (meth)acrylate, 3-methoxy-n-propyl (meth)acrylate, 2-propoxyethyl (meth)acrylate, 2-butoxyethyl (meth)acrylate, isobutoxybutyldiglycol (meth)acrylate, 2-phenoxyethyl (meth)acrylate, methoxypolyethylene glycol (meth)acrylate, ethoxypolyethylene glycol (meth)acrylate, butoxypolyethylene glycol (meth)acrylate, and phenoxypolyethylene glycol (meth)acrylate;

a hydroxyalkyl (meth)acrylate, such as hydroxymethyl (meth)acrylate, 2-hydroxyethyl (meth)acrylate, 2-hydroxypropyl (meth)acrylate, 4-hydroxybutyl (meth)acrylate, and 2-hydroxy-3-phenoxypropyl (meth)acrylate;

glycidyl (meth)acrylate;

an organosiloxane group-containing (meth)acrylate; and a vinyl compound, such as styrene, α-methylstyrene, vinyl acetate, vinyl benzoate, vinyltoluene, acrylonitrile, vinylpyridine, vinylpyrrolidone, and vinyl chloride. These monomers may be used alone or as a combination of two or more kinds thereof.

Among these, an alkyl (meth)acrylate (in which the number of carbon atoms of the alkyl group is preferably from 1 to 20, more preferably from 1 to 12, further preferably from 1 to 6, and still further preferably 1 to 4), an alkoxyalkyl (meth)acrylate (in which the numbers of carbon atoms of the alkyl group in the alkoxy group, and the alkyl group each are preferably from 1 to 20, more preferably from 1 to 12, further preferably from 1 to 6, and still further preferably 1 to 4), and a hydroxyalkyl (meth)acrylate (in which the number of carbon atoms of the alkyl group is preferably from 1 to 20, more preferably from 1 to 12, further preferably from 1 to 6, and still further preferably 1 to 4) are preferred.

As the monomer (a2), at least an alkyl (meth)acrylate is preferably contained, and the content of an alkyl (meth) acrylate in the monomer (a2) is preferably 50% by mass or more, more preferably 70% by mass or more, and further preferably 90% by mass or more.

The hydrolyzable polymer (A) preferably has a content of a constituent unit derived from the monomer (a2) of from 40 to 99% by mass, and more preferably from 70 to 95% by mass, based on the total constituent units.

The hydrolyzable polymer (A) can be produced, for example, in the following procedure.

The monomer (a1) can be synthesized, for example, in a known method, in which a metal compound (which is preferably an inorganic metal compound, specific examples of which include an oxide, a hydroxide, a chloride, and an organic acid salt of copper or zinc (e.g., zinc acetate)) and an organic acid, such as methacrylic acid or acrylic acid, or an ester thereof are heated and stirred in the presence of an organic solvent and water at a temperature equal to or lower than the decomposition temperature of the metal salt.

More specifically, a mixed liquid containing a solvent and a metal component, such as zinc oxide, is stirred under heating to approximately from 50 to 80° C., to which a mixed liquid of an organic acid, such as methacrylic acid or acrylic acid, or an ester thereof, and water and the like is added dropwise, and the mixture is further stirred to prepare the monomer (a1) having a metal ester group.

Subsequently, a solvent is placed in a separately prepared vessel and heated to approximately from 80 to 120° C., to which a mixed liquid of the monomer (a1) having a metal ester group, the other monomer (a2), a polymerization initiator, a chain transfer agent, a solvent, and the like is added dropwise, thereby performing polymerization reaction to provide the hydrolyzable polymer (A) having a metal ester group.

The proportions of the contents (masses) of the constituent units derived from the monomers in the hydrolyzable polymer (A) can be assumed to be the same as the proportions of the charged amounts (masses) of the monomers used for the polymerization reaction.

The polymerization initiator that can be used for the production of the hydrolyzable polymer (A) is not particularly limited, and various radical polymerization initiators can be used. Specific examples thereof include benzoyl peroxide, hydrogen peroxide, cumene hydroperoxide, tert-butyl hydroperoxide, potassium persulfate, sodium persulfate, 2,2'-azobis(isobutyronitrile) (AIBN), 2,2'-azobis(2-methylbutyronitrile) (AMBN), 2,2'-azobis(2,4-dimethylvaleronitrile) (ADVN), and tert-butyl peroctoate (TBPO). The polymerization initiators may be used alone or as a combination of two or more kinds thereof. The radical polymerization initiator may be added into the reaction system only at the start of the reaction, or may be added into the reaction system both at the start of the reaction and in the course of the reaction.

The amount of the polymerization initiator used in the production of the hydrolyzable polymer (A) is preferably from 2 to 20 parts by mass per 100 parts by mass in total of the monomers.

The chain transfer agent that can be used for the production of the hydrolyzable polymer (A) is not particularly limited, and examples thereof include α-methylstyrene dimer, thioglycolic acid, diterpene, terpinolene, α-terpinene; mercaptans, such as tert-dodecylmercaptan and n-dodecyl-mercaptan; a halide, such as carbon tetrachloride, methylene chloride, bromoform, and bromotrichloroethane; a secondary alcohol, such as isopropanol; and glycerin. The chain transfer agents may be used alone or as a combination of two or more kinds thereof.

In the case where the chain transfer agent is used in the production of the hydrolyzable polymer (A), the amount thereof used is preferably from 0.1 to 5 parts by mass per 100 parts by mass in total of the monomers.

Examples of the solvent that can be used for the production of the hydrolyzable polymer (A) include an aromatic-based solvent, such as toluene, xylene, and mesitylene; an alcohol, such as propanol, butanol, propylene glycol monomethyl ether, and dipropylene glycol monomethyl ether; a ketone, such as methyl ethyl ketone, methyl isobutyl ketone, and methyl amyl ketone; an ester, such as ethyl acetate and butyl acetate; and water.

In the case where the solvent is used in the production of the hydrolyzable polymer (A), the amount thereof used is not particularly limited, and is preferably from 5 to 150 parts by mass per 100 parts by mass in total of the monomers.

The production method of the hydrolyzable polymer (A) is not limited to the above, and the hydrolyzable polymer (A) may be produced by a method of reacting a polymer (a3) having a carboxy group, a monocarboxylic acid compound (F) described later, and a metal compound (which is preferably an inorganic metal compound, specific examples of which include an oxide, a hydroxide, a chloride, and an organic acid salt of copper or zinc (e.g., zinc acetate)), so as to introduce a metal ester group to the carboxy group of the polymer (a3), or a method of reacting a polymer (a3) having a carboxy group and a metal compound, so as to introduce a metal ester crosslink to the polymer.

Examples of the polymer (a3) having a carboxy group include a polyester-based polymer (a3-1) and an acrylic-based polymer (a3-2), and a polyester-based polymer (a3-1) is preferred.

Examples of the polyester-based polymer (a3-1) include a polyester resin having an acid group.

The polyester-based polymer (a3-1) preferably has an acid value of the solid content of from 30 to 250 mgKOH/g, and more preferably from 50 to 200 mgKOH/g.

The polyester-based polymer (a3-1) can be obtained through reaction of one or more of a polyhydric alcohol and one or more of a polycarboxylic acid and/or an anhydride thereof, arbitrary kinds of which may be used in arbitrary amounts, and the acid value and the viscosity of the polymer can be controlled by the combination thereof.

Preferred examples of the polyester-based polymer (a3-1) include one described in WO 2014/010702 obtained in such a manner that a trihydric or higher hydric alcohol (a3-11), a dibasic acid and/or an anhydride thereof (a3-12), and a dihydric alcohol (a3-13) are reacted, and then an alicyclic dibasic acid and/or an anhydride thereof (a3-14) are further reacted therewith.

The hydrolyzable polymer (A) may also be produced by a method of reacting the polyester-based polymer (a3-1), a monocarboxylic acid (F), and a metal compound, or a method of reacting the polyester-based polymer (a3-1) and a metal compound, as described above.

The monocarboxylic acid compound (F) to be reacted with the polyester-based polymer (a3-1) may be ones described later, and is preferably a rosin compound, and examples of the metal compound used include a metal oxide, such as zinc oxide and copper oxide, in which zinc oxide is preferably used.

Examples of the acrylic-based polymer (a3-2) include an acrylic-based polymer (a3-2) containing a carboxy group obtained through radical polymerization of, as a polymerizable compound (monomer), an unsaturated carboxylic acid, such as acrylic acid, methacrylic acid, 3-(meth)acryloyloxypropionic acid, or 3-(meth)acryloyloxy-2-methylpropionic acid, and depending on necessity the other monomer (a2).

As similar to the polyester-based polymer (a3-1), the hydrolyzable polymer (A) may produced by a method of reacting the acrylic-based polymer (a3-2), the monocarboxylic acid (F), and the metal compound (which is preferably an inorganic metal compound, specific examples of which include an oxide, a hydroxide, a chloride, and an organic acid salt of copper or zinc (e.g., zinc acetate)), or a method of reacting the acrylic-based polymer (a3-2) and the metal compound.

The hydrolyzable polymer (A) preferably has a content of copper and/or zinc of from 0.5 to 25% by mass, and more preferably from 1 to 20% by mass, based on the hydrolyzable polymer (A), from the standpoint of the formation of the antifouling coating film excellent in coating film renewability and antifouling performance. The content of copper and/or zinc can be measured with an X-ray diffraction apparatus or an ICP emission analysis apparatus, and can be appropriately controlled by the amounts of the monomers used for the synthesis of the hydrolyzable polymer (A).

The hydrolyzable polymer (A) preferably has an acid value of from 30 to 250 mgKOH/g from the standpoint of the dissolution rate of the resulting antifouling coating film into water within a prescribed range.

The acid value that is 30 mgKOH/g or more is preferred since the hydrolyzable polymer (A) may have a suitable metal content to provide an antifouling coating film excellent in antifouling performance. The acid value that is 250 mgKOH/g or less is preferred since an antifouling coating film excellent in long-term antifouling performance may be obtained.

The number average molecular weight (Mn) and the weight average molecular weight (Mw) of the hydrolyzable polymer (A) are preferably controlled appropriately in consideration of the viscosity and the storage stability of the antifouling coating composition and the elution rate (renewability) of the resulting antifouling coating film.

The number average molecular weight (Mn) of the hydrolyzable polymer (A) is preferably from 500 to 100,000, and more preferably from 700 to 50,000. The weight average molecular weight (Mw) of the hydrolyzable polymer (A) is preferably from 1,000 to 200,000, more preferably from 1,200 to 100,000, and further preferably from 3,000 to 100,000.

The number average molecular weight (Mn) and the weight average molecular weight (Mw) can be obtained by measuring by gel permeation chromatography and converting based on the standard polystyrene.

The hydrolyzable polymer (A) may be used alone as one kind thereof or may be used as a combination of two or more kinds thereof.

The antifouling coating composition preferably has a content of the hydrolyzable polymer (A) in the antifouling coating composition of from 3 to 50% by mass, more preferably from 5 to 35% by mass, and further preferably from 7 to 25% by mass, from the standpoint of the coating workability of the antifouling coating composition or the production of an antifouling coating film excellent in retention of the surface renewability and water resistance. The antifouling coating composition preferably has a content of the hydrolyzable polymer (A) in the solid content of the antifouling coating composition of from 1 to 50% by mass, more preferably from 3 to 40% by mass, and further preferably from 5 to 35% by mass.

In the present invention, in the case where two or more kinds of the hydrolyzable polymers (A) are contained, the aforementioned contents are preferred ranges for the total content of the hydrolyzable polymers (A), which is also the same as in the components described later.

<Zinc Oxide (B)>

The antifouling coating composition of the present invention contains zinc oxide (B). The use of the particular amount of the zinc oxide (B) along with the hydrolyzable polymer (A) and the medetomidine (C) may provide an antifouling coating film that is excellent in drying property, is excellent in damage resistance of the coating film, and can retain a high antifouling performance for a prolonged period of time.

The aforementioned effects are not a simple combination of the effects of each of the hydrolyzable polymer (A), the zinc oxide (B), and the medetomidine (C), but are derived from the synergistic effect obtained only by using them in combination.

The antifouling coating composition of the present invention has a content of the zinc oxide (B) in the solid content of the antifouling composition of the present invention of from 27 to 60% by mass, preferably from 27 to 58% by mass, and more preferably from 27 to 55% by mass, from the standpoint of the retention of the high antifouling performance for a prolonged period of time, the production of the antifouling coating film having good coating film properties, and the like.

<Medetomidine (C)>

The antifouling coating composition of the present invention contains medetomidine (C).

Medetomidine is (+/−)-4-[1-(2,3-dimethylphenyl)ethyl]-1H-imidazole, and is represented by the following formula (2).

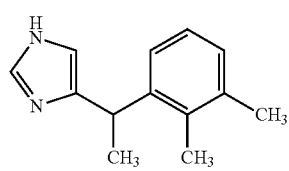

(2)

Medetomidine has optical isomerism, and only one isomer thereof or a mixture of isomers at an arbitrary ratio may be used.

As a part or the whole of the medetomidine, an adduct thereof to an imidazolium salt, a metal, or the like may be mixed, or an adduct thereof to an imidazolium salt, a metal, or the like may be formed in the antifouling coating composition or the antifouling coating film.

The antifouling coating composition of the present invention has a content of the medetomidine (C) in the antifouling coating composition of from 0.01 to 30% by mass, more preferably from 0.015 to 25% by mass, further preferably from 0.02 to 20% by mass, and still further preferably from 0.05 to 2% by mass, from the standpoint of the retention of the high antifouling performance for a prolonged period of time, the production of the antifouling coating film having excellent paint property in a well balanced manner, and the like.

<Optional Components>

The antifouling coating composition of the present invention may contain, depending on necessity in addition to the aforementioned components, an organic antifouling agent (D), cuprous oxide (E), a monocarboxylic acid compound (F) and/or a metal ester thereof, an inorganic copper compound (G) except for cuprous oxide, a coloring pigment (H), an extender pigment (I), a pigment dispersant (J), a plasticizer (K), an anti-sagging agent (L), an anti-settling agent (M), a dehydrating agent (N), a solvent (O), the other resin (P), and the like.

The optional components will be described below.

[Organic Antifouling Agent (D)]

The antifouling coating composition of the present invention preferably further contains an organic antifouling agent (D) for further enhancing the antifouling performance of the antifouling coating film formed with the antifouling coating composition of the present invention. The organic antifouling agent (D) is an organic antifouling agent except for the medetomidine (C).

Examples of the organic antifouling agent (D) include a metal pyrithione, such as copper pyrithione and zinc pyrithione, 4,5-dichloro-2-n-octyl-4-isothiazolin-3-one (trivial name: DCOIT), 4-bromo-2-(4-chlorophenyl)-5-(trifluoromethyl)-1H-pyrrole-3-carbonitrile (trivial name: tralopyril), pyridine triphenyl borane, 4-isopropylpyridine diphenylmethyl borane, N,N-dimethyl-N'-(3,4-dichlorophenyl)urea (trivial name: diuron), N-(2,4,6-trichlorophenyl)maleimide, 2,4,5,6-tetrachloroisophthalonitrile, 2-methylthio-4-tert-butylamino-6-cyclopropylamino-1,3,5-triazine (trivial name: cybutryne), bisdimethyldithiocarbamoyl zinc ethylene bisdithiocarbamate (trivial name: polycarbamate), chloromethyl-n-octyl disulfide, N,N'-dimethyl-N'-phenyl-(N-fluorodichloromethylthio)sulfamide (trivial name: dichlofluanide), tetraalkylthiuram disulfide (trivial name: TMTD), zinc dimethyl dithiocarbamate (trivial name: ziram), zinc ethylene bisdithiocarbamate, 2,3-dichloro-N-(2',6'-diethylphenyl)maleimide, and 2,3-dichloro-N-(2'-ethyl-6'-methylphenyl)maleimide. The organic antifouling agent (D) may be used alone or as a combination of two or more kinds thereof.

The antifouling coating composition of the present invention preferably contains at least one selected from the group consisting of a copper pyrithione and a zinc pyrithione as an organic antifouling agent (D), and more preferably contains a copper pyrithione. The at least one selected from the group consisting of a copper pyrithione and a zinc pyrithione contained may provide an antifouling coating film excellent in damage resistance. In particular, the antifouling coating composition that contains copper pyrithione may provide an antifouling coating film having low consumption properties and a high antifouling performance, which may results in a small film thickness of the antifouling coating film and further the antifouling film excellent in damage resistance, and therefore a copper pyrithione is preferably contained as the organic antifouling agent (D).

The copper pyrithione and zinc pyrithione are represented by the following formula (3).

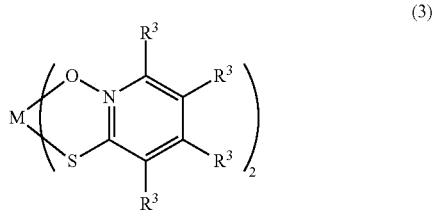

In the formula (3), $R^3$ each independently represent a hydrogen atom, or an alkyl group, a cyclic alkyl group, an alkenyl group, an aryl group, an alkoxy group, or a halogenated alkyl group, each having 1 to 6 carbon atoms; and M represents Cu or Zn.

In the formula (3), $R^3$ preferably represents a hydrogen atom.

The antifouling coating composition of the present invention also preferably further contains an organic antifouling agent except for the copper pyrithione and zinc pyrithione, as the organic antifouling agent (D), in addition to the at least one selected from the group consisting of a copper pyrithione and a zinc pyrithione.

The antifouling coating composition of the present invention preferably has a content of the organic antifouling agent (D) in the solid content of the antifouling coating composition of the present invention of from 1 to 50% by mass, more preferably from 1.5 to 45% by mass, and further preferably from 2 to 40% by mass, from the standpoint of the balance between the enhancement of the long-term antifouling performance and the coating film property of the formed antifouling coating film.

[Cuprous Oxide (E)]

The composition of the present invention may further contain cuprous oxide (E).

The cuprous oxide (E) preferably has an average particle diameter of approximately from 3 to 30 μm for exhibiting the long-term antifouling performance.

The cuprous oxide (E) is preferably surface-treated with glycerin, stearic acid, lauric acid, sucrose, lecithin, a mineral oil, or the like, from the standpoint of the long-term stability in storage.

Examples of the commercially available product of the cuprous oxide (E) include NC-301 (produced by Nissin Chemco, Ltd.), NC-803 (produced by Nissin Chemco, Ltd.), Red Copp 97N Premium (produced by American Chemet Corporation), Purple Copp 97N (produced by American Chemet Corporation), and LoLoTint 97 (produced by American Chemet Corporation).

The cuprous oxide (E) has a high environmental load, and the antifouling coating composition of the present invention can exhibit the excellent antifouling performance for a prolonged period of time without the use of the cuprous oxide (E).

The antifouling coating composition of the present invention preferably has a content of cuprous oxide (E) in the solid content thereof of 10% by mass or less, more preferably 5% by mass or less, further preferably 1% by mass or less, and still further preferably 0.5% by mass or less, and particularly preferably has substantially no cuprous oxide (E) contained. The expression "substantially no cuprous oxide (E) contained" means that the cuprous oxide (E) is not intentionally added, and does not exclude a small amount of the cuprous oxide (E) that exists as an impurity.

The content of cuprous oxide within the range is preferred since due to the small content of cuprous oxide in dark red color, the range of selection of the color of the antifouling coating composition can be enhanced, and the resulting antifouling coating film has a clear hue with less discoloration.

[Monocarboxylic Acid Compound (F) and/or Metal Ester Thereof]

The antifouling coating composition of the present invention preferably further contains a monocarboxylic acid compound (F) and/or a metal ester thereof.

In the present invention, the monocarboxylic acid compound (F) and/or a metal ester thereof enhances the renewability of the formed antifouling coating film from the surface thereof in water, whereby in the case where the antifouling coating film contains an antifouling agent, the discharge thereof to water is accelerated to facilitate the enhancement of the antifouling performance, and furthermore appropriate water resistance is imparted to the antifouling coating film.

Examples of the monocarboxylic acid compound (F) include a rosin compound, such as gum rosin, wood rosin, and tall oil rosin, and a rosin derivative, such as hydrogenated rosin and disproportionate rosin, and examples of the other monocarboxylic acid compound include an aliphatic or alicyclic monocarboxylic acid. Specific examples of the other monocarboxylic acid compound include trimethylisobutenylcyclohexenecarboxylic acid, naphthenic acid, versatic acid, stearic acid, and salicylic acid. These compounds may be used alone or as a combination of two or more kinds thereof.

The monocarboxylic acid compound (F) may form a metal ester, and examples thereof include a zinc ester and a copper ester. The metal ester may be formed in advance before the production of the antifouling coating composition or may be formed through reaction with the other component in the production of the antifouling coating composition.

The content of the monocarboxylic acid compound (F) and/or a metal ester thereof in the solid content of the antifouling coating composition of the present invention is preferably from 0.05 to 50% by mass, more preferably from 0.1 to 40% by mass, further preferably from 0.15 to 30% by mass, and still further preferably from 1 to 20% by mass, from the standpoint of the enhancement of the coating workability and the further enhancement of the antifouling performance.

[Inorganic Copper Compound (G) Except for Cuprous Oxide]

The antifouling coating composition of the present invention may further contain an inorganic copper compound (G) except for the cuprous oxide (E) for further enhancing the antifouling performance of the antifouling coating film formed therewith. Examples of the inorganic copper compound include copper thiocyanate and cupronickel. The inorganic copper compound (G) may be used alone or as a combination of two or more kinds thereof.

In the antifouling coating composition of the present invention, the content of the inorganic copper compound (G)

except for cuprous oxide in the solid content of the antifouling coating composition of the present invention is preferably from 0 to 50% by mass, more preferably from 0 to 40% by mass, and further preferably from 0 to 30% by mass, from the standpoint of the enhancement of the long-term antifouling performance of the antifouling coating film.

[Coloring Pigment (H)]

The antifouling coating composition of the present invention may contain a coloring pigment (H) from the standpoint of the control of the color tone of the antifouling coating film formed with the antifouling coating composition of the present invention and imparting an arbitrary color tone thereto.

Examples of the coloring pigment (H) include known organic or inorganic coloring pigments. Examples of the organic coloring pigment include naphthol red and phthalocyanine blue. Examples of the inorganic coloring pigment include carbon black, bengal red (red iron oxide), barite powder, titanium white, and yellow iron oxide. The coloring pigment (H) may be used alone or as a combination of two or more kinds thereof.

The antifouling coating composition of the present invention may contain a colorant, such as a dye, except for the coloring pigment (H), along with the coloring pigment (H) or instead of the coloring pigment (H).

In the antifouling coating composition of the present invention, the content of the coloring pigment (H) in the solid content of the antifouling coating composition of the present invention is preferably from 0.1 to 30% by mass, more preferably from 0.1 to 25% by mass, and further preferably from 0.1 to 20% by mass, from the standpoint of the enhancement of the coloring property, the hiding power, the discoloration property on exposure, the antifouling performance, and the coating film water resistance (mechanical characteristics) of the resulting antifouling coating film.

[Extender Pigment (I)]

The antifouling coating composition of the present invention may contain an extender pigment for the purpose of enhancing the coating film properties, such as the water resistance and the crack resistance, of the resulting antifouling coating film.

Examples of the extender pigment (I) include talc, silica, mica, clay, potassium feldspar, calcium carbonate, kaolin, alumina white, white carbon, aluminum hydroxide, magnesium carbonate, barium carbonate, and barium sulfate. Among these, talc, silica, mica, clay, calcium carbonate, kaolin, barium sulfate, and potassium feldspar are preferred. Calcium carbonate and white carbon may also be used as an anti-settling agent (M) described later or a matting agent. The extender pigment (I) may be used alone or as a combination of two or more kinds thereof.

In the antifouling coating composition of the present invention, the content of the extender pigment (I) in the solid content of the antifouling coating composition of the present invention is preferably from 0.1 to 50% by mass, and more preferably from 0.1 to 40% by mass, from the standpoint of the enhancement of the water resistance, the mechanical characteristics, and the antifouling performance of the resulting antifouling coating film.

[Pigment Dispersant (J)]

In the case where the antifouling coating composition of the present invention contains the coloring pigment or the extender pigment, the antifouling coating composition of the present invention may contain a pigment dispersant (J) for the purpose of enhancing the pigment dispersibility.

Examples of the pigment dispersant (J) include known organic or inorganic pigment dispersants. Examples of the pigment dispersant include an aliphatic amine compound or an organic acid compound (for example, "Duomeen TDO" (produced by Lion Corporation) and "Disperbyk 101" (produced by BYK-Chemie Japan K.K.)). The pigment dispersant (J) may be used alone or as a combination of two or more kinds thereof.

In the antifouling coating composition of the present invention, the content of the pigment dispersant (J) in the solid content of the composition of the present invention is preferably from 0.01 to 30% by mass, and more preferably from 0.01 to 20% by mass, from the standpoint of the effect of decreasing the paint viscosity of the antifouling coating composition and the enhancement of the prevention effect against the color separation of the antifouling coating film.

[Plasticizer (K)]

The antifouling coating composition of the present invention may contain a plasticizer (K) for the purpose of imparting plasticity to the antifouling coating film.

Examples of the plasticizer (K) include tricresyl phosphate (TCP), dioctyl phthalate (DOP), and diisodecyl phthalate (DIDP). The plasticizer may be used alone or as a combination of two or more kinds thereof.

In the case where the antifouling coating composition of the present invention contains the plasticizer (K), the content thereof in the solid content of the coating composition is preferably from 0.1 to 10% by mass, and more preferably from 0.5 to 5% by mass. In the case where the content of the plasticizer (K) is in the range, the plasticity of the antifouling coating film can be kept good.

With respect to the content of the plasticizer (K) in the antifouling coating composition of the present invention from the standpoint of improving the antifouling performance and the crack resistance of the antifouling coating film formed with the antifouling coating composition, the content of the plasticizer (K) in the solid content of the antifouling coating composition of the present invention is preferably from 0.1 to 30% by mass, more preferably from 0.1 to 25% by mass, and further preferably from 0.1 to 20% by mass.

[Anti-Sagging Agent (L)]

When the antifouling coating composition of the present invention is applied on a substrate, an anti-sagging agent (L) (which may also be referred to as an anti-running agent) may be contained therein from the standpoint of the reduction of the sagging of the coating composition.

Examples of the anti-sagging agent (L) include amide wax, hydrogenated castor oil wax, a mixture thereof, and synthetic fine powder silica. The anti-sagging agent (L) may be used alone or as a combination of two or more kinds thereof.

Among these, the anti-sagging agent (L) is preferably amide wax or synthetic fine powder silica. In the case where amide wax or synthetic fine powder silica is used as the anti-sagging agent (L), the storage stability of the antifouling coating composition can be enhanced, and in the case where after forming the antifouling coating film, a coating film (top coating film) formed of a coating composition of the same kind (i.e., an antifouling coating composition) or a coating composition of a different kind is formed on the antifouling coating film, the adhesiveness (i.e., the interlayer adhesiveness or the recoating capability) between the antifouling coating film and the top coating film can be prevented from being decreased.

Examples of the commercially available product of the anti-sagging agent (L) include "Disperlon A630-20X" (produced by Kusumoto Chemicals, Ltd.) and "ASAT-250F" (produced by Itoh Oil Chemicals, Co., Ltd).

In the antifouling coating composition of the present invention, the content of the anti-sagging agent (L) in the solid content of the antifouling coating composition is preferably from 0.01 to 20% by mass, and more preferably from 0.2 to 15% by mass.

[Anti-Settling Agent (M)]

The antifouling coating composition may contain an anti-settling agent (M) from the standpoint of the prevention of the formation of precipitates in storage and the enhancement of the stirring capability.

Examples of the anti-settling agent (M) include a stearate of Al, Ca, or Zn, polyethylene wax, and oxidized polyethylene-based wax. The anti-settling agent (M) may be used alone or as a combination of two or more kinds thereof.

Among these, the anti-settling agent (M) is preferably oxidized polyethylene-based wax. Examples of the commercially available product of the oxidized polyethylene-based wax include "Disperlon 4200-20X" (produced by Kusumoto Chemicals, Ltd.).

In the antifouling coating composition of the present invention, the content of the anti-settling agent (M) in the solid content of the antifouling coating composition is preferably from 0.1 to 20% by mass, and more preferably from 0.2 to 15% by mass.

[Dehydrating Agent (N)]

The antifouling coating composition of the present invention exhibits excellent storage stability due to the use of the hydrolyzable polymer (A) having good storage stability, and may contain a dehydrating agent (N) depending on necessity to provide further excellent long-term storage stability. Examples of the dehydrating agent (N) include synthetic zeolite, anhydrous gypsum and hemihydrate gypsum (trivial name: calcined gypsum) as an inorganic-based dehydrating agent, and include an alkoxysilane, such as tetramethoxysilane, tetraethoxysilane, tetrabutoxysilane, tetraphenoxysilane, methyltriethoxysilane, dimethyldiethoxysilane, and trimethylethoxysilane, a polyalkyoxysilane as a condensate of the alkoxysilane, and an alkyl orthoformate, such as methyl orthoformate and ethyl orthoformate, as an organic dehydrating agent. The dehydrating agent (N) may be used alone or as a combination of two or more kinds thereof.

In the antifouling coating composition, the content of the dehydrating agent (N) in the solid content of the antifouling coating composition is preferably from 0.1 to 20% by mass, and more preferably from 0.2 to 15% by mass.

[Solvent (O)]

The antifouling coating composition of the present invention may contain a solvent (O), such as water or an organic solvent, depending on necessity for the purpose of enhancing the dispersibility of the hydrolyzable polymer (A) and controlling the viscosity of the antifouling coating composition. The antifouling coating composition of the present invention may contain, as the solvent (O), the solvent that is used in the preparation of the hydrolyzable polymer (A), or a solvent that is separately added when mixing the hydrolyzable polymer (A) and the other components depending on necessity. The solvent (O) is preferably an organic solvent.

Examples of the organic solvent include an aromatic-based organic solvent, such as xylene, toluene, and ethylbenzene; a ketone, such as methyl ethyl ketone, methyl isobutyl ketone, and cyclohexanone; an aliphatic monohydric alcohol (having a number of carbon atoms of from 1 to 10, and preferably approximately from 2 to 5), such as ethanol, isopropyl alcohol, n-butanol, and isobutanol; and an ester-based solvent, such as ethyl acetate and butyl acetate. The solvent (O) may be used alone or as a combination of two or more kinds thereof.

The amount of the solvent (O) mixed may be appropriately controlled, and is preferably such a ratio that makes a total solid content of the antifouling coating composition of the present invention of from 20 to 90% by mass, and the amount of the solvent (O) added may be appropriately controlled for application depending on the workability to be desired.

[Other Resin (P)]

The antifouling coating composition of the present invention may contain the other resin (P) than the hydrolyzable polymer (A), in addition to the aforementioned components. The other resin may be used alone or as a combination of two or more kinds thereof.

Examples of the resin include a water insoluble or water sparingly soluble resin, such as chlorinated paraffin, an acrylic resin that does not contain a metal ester group, an acrylic silicone resin, a polyester resin, an unsaturated polyester resin, a fluorine resin, a polybutene resin, silicone rubber, a polyurethane resin, an epoxy resin, a polyamide resin, a vinyl resin (e.g., a vinyl chloride-based copolymer and an ethylene-vinyl acetate copolymer), a polyvinyl alkyl ether, chlorinated rubber, a chlorinated olefin resin, a styrene-butadiene copolymer resin, a ketone resin, an alkyd resin, a coumarone resin, a terpene phenol resin, and a petroleum resin, and a water soluble resin, such as pine tar.

The chlorinated paraffin may have any of straight-chain and branched-chain molecular structures, and may be in a liquid state or a solid state (for example, in a powder form) under condition of room temperature (for example, 23° C.).

The chlorinated paraffin preferably has an average number of carbon atoms of from 8 to 30, and more preferably from 10 to 26, per one molecule. The antifouling coating composition containing the chlorinated paraffin can form an antifouling coating film that causes less cracks (breakage) and peeling. When the average number of carbon atoms is less than 8, the effect of suppressing the occurrence of cracks in the antifouling coating film may be insufficient in some cases, whereas when the average number of carbon atoms exceeds 30, the hydrolyzability (i.e., the renewability and the self-polishing property) may be decreased, resulting in an inferior antifouling performance in some cases.

The chlorinated paraffin preferably has a viscosity (unit: poise, measurement temperature: 25° C.) of 1 or more, and more preferably 1.2 or more, and a specific gravity (25° C.) of from 1.05 to 1.80 g/cm$^3$, and more preferably from 1.10 to 1.70 g/cm$^3$.

The chlorinated paraffin generally has a chlorination degree (chlorine content) of from 35 to 70 parts by mass, and preferably from 35 to 65 parts by mass, assuming that chlorinated paraffin is 100 parts by mass. The antifouling coating composition containing the chlorinated paraffin having the chlorination degree can form a coating film that causes less cracks (breakage), peeling, and the like. Specific examples of the chlorinated paraffin include "Toyoparax 150" and "Toyoparax A-70" (all produced by Tosoh Corporation).

Examples of the petroleum resin include a C5 series, a C9 series, a styrene series, a dichloropentadiene series, and hydrogenated products thereof. Specific examples of the petroleum resin include "Quintone 1500" and "Quintone 1700" (all produced by Zeon Corporation).

[Production Method of Antifouling Coating Composition]

The coating composition of the present invention can be prepared by the same equipment, procedures, and the like as for the known ordinary antifouling paint. For example, the antifouling coating composition may be produced by preparing the hydrolyzable polymer (A) in advance, and then adding, stirring, and mixing at one time or sequentially the hydrolyzable polymer (A) (reaction solution), the zinc oxide (B), the medetomidine (C), and depending on necessity the other components (D) to (0) and the like.

[Antifouling Coating Film and Substrate with Antifouling Coating Film, Method for Producing Same, and Antifouling Method]

The antifouling coating film of the present invention is formed with the antifouling coating composition of the present invention, and can be obtained by drying the antifouling coating composition.

Specifically, the antifouling coating film can be obtained, for example, by applying the antifouling coating composition of the present invention on a coating film in existence or a substrate, and then drying (curing) the coating composition. Examples of the method for applying the antifouling coating composition of the present invention include known methods using a brush, a roller, a spray, and the like.

The antifouling coating composition applied according to the aforementioned method may be dried, for example, by allowing to stand under a condition of 25° C. for a period of approximately from 0.5 to 7 days, preferably approximately from 0.5 to 5 days, and more preferably approximately from 0.5 to 3 days, so as to provide a coating film. The coating composition may be dried while blowing the air under heating.

The thickness of the antifouling coating film after drying may be arbitrarily selected corresponding to the self-polishing rate and the period of use of the antifouling coating film, and is preferably, for example, approximately from 30 to 1,000 μm. Examples of the method for producing the antifouling coating film having the thickness include a method of applying the coating composition once or plural times to a thickness per one time applying of preferably from 10 to 300 m, and more preferably from 30 to 200 μm.

The substrate with an antifouling coating film according to the present invention is one coated with an antifouling coating film formed with the antifouling coating composition, and has the antifouling coating film on a substrate.

The method for producing the substrate with an antifouling coating film according to the present invention is not particularly limited, and the substrate with an antifouling coating film can be obtained, for example, by a production method including: (I) a step of providing an applied material or an impregnated material by applying the antifouling coating composition of the present invention on a substrate or impregnating a substrate with the antifouling coating composition of the present invention; and (II) a step of drying the applied material or the impregnated material.

In the step (I), the method for applying the coating composition on the substrate may be the aforementioned coating method. The method for impregnating is not particularly limited, and may be performed by immersing the substrate in the coating composition in an amount that is sufficient for the impregnation. The method for drying the applied material or the impregnated material is not particularly limited, and the material may be dried in the similar manner as in the production of the antifouling coating film.

The substrate with an antifouling coating film of the present invention can also be obtained by a method including: (i) a step of forming a coating film by drying the antifouling coating composition of the present invention; and (ii) a step of attaching the coating film to a substrate.

In the step (i), the method for forming the coating film is not particularly limited, and the coating film can be produced in the similar method as in the production of the antifouling coating film.

In the step (ii), the method for attaching the coating film to a substrate is not particularly limited, and the coating film can be attached, for example, by the method described in JP 2013-129724 A.

The antifouling method of the present invention uses an antifouling coating film formed with the antifouling coating composition of the present invention, and the fouling, specifically adhesion of aquatic organisms and the like, is prevented by coating the surface of the substrate with the antifouling coating film.

The antifouling coating composition of the present invention can be utilized for retaining the antifouling performance of the substrate for a prolonged period of time in a wide range of industrial fields including ships, fishery, marine structures, and the like. Examples of the substrate include a ship (such as an outside shell of a ship's hull of a large scale steel-hulled ship, e.g., a container ship and a tanker, a fishing boat, an FRP boat, a wood boat, a yacht, and the like, and a newly built ship and a repaired ship), a fishing material (such as a rope, a fishing net, a fishing gear, a float, and a buoy), and an marine structure, such as a mega-float. Among these, the substrate is preferably selected from the group consisting of a ship, an underwater structure, and a fishing gear, more is more preferably selected from the group consisting of a ship and an underwater structure, and is further preferably a ship.

The substrate, on which the antifouling coating composition of the present invention is to be formed on the surface thereof, may have a surface having been treated with other treating agents, such as a rust inhibitor, a surface having been coated with a certain coating film, such as a primer, or a surface having been coated with the antifouling coating composition of the present invention.

EXAMPLES

The present invention will be described more specifically with reference to examples below, but the present invention is not limited to the examples. In the following description, the "part" means part by mass unless departing from the sprit.

[Production of Hydrolyzable Polymer (A)]

For producing the hydrolyzable polymer (A), hydrolyzable group-containing monomers (a1-1) and (a1-2) were prepared in the following manner.

Preparation Example 1: Preparation of Hydrolyzable Group-Containing Monomer (Metal Ester Group-Containing Monomer) (a1-1)

85.4 parts by mass of propylene glycol monomethyl ether and 40.7 parts by mass of zinc oxide were charged in a reaction vessel equipped with a stirrer, a condenser, a thermometer, a dropping device, a nitrogen introducing tube, and a heating and cooling jacket, and heated to 75° C. under stirring. Subsequently, a mixture of 43.1 parts by mass of methacrylic acid, 36.1 parts by mass of acrylic acid, and 5.0 parts by mass of water was added dropwise thereto from the dropping device at a constant dropping rate over 3 hours. After completing the dropwise addition, the mixture was further stirred for 2 hours, and then 36.0 parts by mass of propylene glycol monomethyl ether was added thereto, so as to provide a reaction liquid containing the hydrolyzable group-containing monomer (metal ester group-containing monomer) (a1-1).

Preparation Example 2: Preparation of Hydrolyzable Group-Containing Monomer (Metal Ester Group-Containing Monomer) (a1-2)

72.4 parts by mass of propylene glycol monomethyl ether and 40.7 parts by mass of zinc oxide were charged in a reaction vessel equipped with a stirrer, a condenser, a thermometer, a dropping device, a nitrogen introducing tube, and a heating and cooling jacket, and heated to 75° C. under stirring. Subsequently, a mixture of 30.1 parts by mass of methacrylic acid, 25.2 parts by mass of acrylic acid, and 51.6 parts by mass of versatic acid was added dropwise thereto from the dropping device at a constant dropping rate over 3 hours. After completing the dropwise addition, the mixture was further stirred for 2 hours, and then 11.0 parts by mass of propylene glycol monomethyl ether was added thereto, so as to provide a reaction liquid containing the hydrolyzable group-containing monomer (metal ester group-containing monomer) (a1-2).

Production Example 1: Production of Hydrolyzable Polymer (Metal Ester Group-Containing Copolymer) Solution (A-1)

15.0 parts by mass of propylene glycol monomethyl ether, 57.0 parts by mass of xylene, and 4.0 parts by mass of ethyl acrylate were charged in a reaction vessel equipped with a stirrer, a condenser, a thermometer, a dropping device, a nitrogen introducing tube, and a heating and cooling jacket, and heated to 100±5° C. under stirring. At the same temperature retained, 52.0 parts by mass of the reaction liquid containing the metal ester group-containing monomer (a1-1) obtained in the Preparation Example 1, 1.0 part by mass of methyl methacrylate, 66.2 parts by mass of ethyl acrylate, 5.4 parts by mass of 2-methoxyethyl acrylate, 2.5 parts by mass of 2,2'-azobisisobutyronitrile as a polymerization initiator, 7.0 parts by mass of 2,2'-azobis(2-methylbutyronitrile) as a polymerization initiator, 1.0 part by mass of "Nofmer MSD", produced by NOF Corporation, as a chain transfer agent, and 10.0 parts by mass of xylene were added dropwise to the reaction vessel from the dropping device over 6 hours. After completing the dropwise addition, 0.5 part by mass of tert-butyl peroctoate (TBPO) as a polymerization initiator and 7.0 parts by mass of xylene were added dropwise thereto over 30 minutes, and after further stirring for 1 hour and 30 minutes, 4.4 parts by mass of xylene was added thereto, so as to prepare a pale yellowish transparent hydrolyzable polymer solution (A-1) containing a hydrolyzable polymer (metal ester group-containing copolymer).

The formulation of the monomers used and the characteristic values of the hydrolyzable polymer solution (A-1) and the resulting hydrolyzable polymer are shown in Table 1. In the table, the theoretical mixing amounts (part by mass) of the monomers are shown.

Production Example 2: Production of Hydrolyzable Polymer (Metal Ester Group-Containing Copolymer) Solution (A-2)

15.0 parts by mass of propylene glycol monomethyl ether, 60.0 parts by mass of xylene, and 4.0 parts by mass of ethyl acrylate were charged in a reaction vessel equipped with a stirrer, a condenser, a thermometer, a dropping device, a nitrogen introducing tube, and a heating and cooling jacket, and heated to 100±5° C. under stirring. At the same temperature retained, 40.2 parts by mass of the reaction liquid containing the metal ester group-containing monomer (a1-1) obtained in the Preparation Example 1, 15.0 parts by mass of methyl methacrylate, 48.0 parts by mass of ethyl acrylate, 15.0 parts by mass of n-butyl acrylate, 2.5 parts by mass of 2,2'-azobisisobutyronitrile as a polymerization initiator, 6.5 parts by mass of 2,2'-azobis(2-methylbutyronitrile) as a polymerization initiator, 1.2 parts by mass of "Nofmer MSD", produced by NOF Corporation, as a chain transfer agent, and 10.0 parts by mass of xylene were added dropwise to the reaction vessel from the dropping device over 6 hours. After completing the dropwise addition, 0.5 part by mass of tert-butyl peroctoate as a polymerization initiator and 7.0 parts by mass of xylene were added dropwise thereto over 30 minutes, and after further stirring for 1 hour and 30 minutes, 8.0 parts by mass of xylene was added thereto, so as to prepare a pale yellowish transparent hydrolyzable polymer solution (A-2) containing a hydrolyzable polymer (metal ester group-containing copolymer).

The formulation of the monomers used and the characteristic values of the hydrolyzable polymer solution (A-2) and the resulting hydrolyzable polymer measured by the methods described later are shown in Table 1.

Production Example 3: Production of Hydrolyzable Polymer (Metal Ester Group-Containing Copolymer) Solution (A-3)

10.0 parts by mass of propylene glycol monomethyl ether, 63.0 parts by mass of xylene, and 3.0 parts by mass of ethyl acrylate were charged in a reaction vessel equipped with a stirrer, a condenser, a thermometer, a dropping device, a nitrogen introducing tube, and a heating and cooling jacket, and heated to 100±5° C. under stirring. At the same temperature retained, 50.3 parts by mass of the reaction liquid containing the metal ester group-containing monomer (a1-2) obtained in the Preparation Example 2, 9.0 parts by mass of methyl methacrylate, 58.0 parts by mass of ethyl acrylate, 5.0 parts by mass of 2,2'-azobis(2-methylbutyronitrile) as a polymerization initiator, and 10.0 parts by mass of propylene glycol monomethyl ether were added dropwise to the reaction vessel from the dropping device over 4 hours. After completing the dropwise addition, 0.5 part by mass of tert-butyl peroctoate as a polymerization initiator and 7.0 parts by mass of xylene were added dropwise thereto over 30 minutes, and after further stirring for 1 hour and 30 minutes, 12.0 parts by mass of xylene was added thereto, so as to prepare a pale yellowish transparent hydrolyzable polymer solution (A-3) containing a hydrolyzable polymer (metal ester group-containing copolymer).

The formulation of the monomers used and the characteristic values of the hydrolyzable polymer solution (A-3) and the resulting hydrolyzable polymer measured by the methods described later are shown in Table 1.

TABLE 1

|  |  | Production Example 1 (A-1) | Production Example 2 (A-2) | Production Example 3 (A-3) |
|---|---|---|---|---|
| Monomer | Reaction liquid containing metal ester group-containing monomer (a1-1) (monomer (part by mass) in parentheses) | 52.0 (23.4) | 40.2 (18.1) |  |
|  | Reaction liquid containing metal ester group-containing monomer (a1-2) (monomer (part by mass) in parentheses) |  |  | 50.3 (30.2) |
|  | Other monomer (a2)  Methyl methacrylate | 1.0 | 15.0 | 9.0 |
|  | Ethyl acrylate | 70.2 | 52.0 | 61.0 |
|  | Butyl acrylate |  | 15.0 |  |
|  | 2-Methoxyethyl acrylate | 5.4 |  |  |
| Characteristics | Solid content (% by mass) | 46.5 | 46.4 | 45.0 |
|  | Viscosity (mPa · s/25°C) | 403 | 397 | 754 |
|  | Zinc content in hydrolyzable polymer solution (% by mass) (Zinc content in hydrolyzable polymer (% by mass) in parentheses) | 2.9 (6.2) | 2.5 (5.4) | 3.3 (7.3) |
|  | Number average molecular weight (Mn) | 820 | 900 | 1,100 |
|  | Weight average molecular weight (Mw) | 4,800 | 5,200 | 5,900 |

Production Example 4: Production of Hydrolyzable Polymer (Metal Ester Group-Containing Copolymer) Solution (A-4)

50.0 parts by mass of n-butanol and 50.0 parts by mass of xylene were charged in a reaction vessel equipped with a stirrer, a condenser, a thermometer, a dropping device, a nitrogen introducing tube, and a heating and cooling jacket, and heated to 115±5° C. under stirring. At the same temperature retained, a mixed liquid containing 58.3 parts by mass of ethyl acrylate, 25.0 parts by mass of cyclohexyl acrylate, 16.7 parts by mass of acrylic acid, and 3.0 parts by mass of tert-butyl peroxy-2-ethylhexanoate was added dropwise to the reaction vessel from the dropping device over 3 hours, and further stirred for 2 hours, so as to prepare a varnish containing carboxylic acid group-containing copolymer (A-4-1).

93.5 parts by mass of the varnish (A-4-1), 33.4 parts by mass of WW rosin, 21.95 parts by mass of zinc acetate, and 50 parts by mass of xylene were charged in a reaction vessel equipped with a stirrer, a decanter, a condenser, a thermometer, a nitrogen introducing tube, and a heating and cooling jacket, and heated to the refluxing temperature, and the reaction was continued for 14 hours while removing the outflowing mixed solution of acetic acid, water, and the solvent, and replenishing the same amount of xylene. The end point of the reaction was determined by quantitatively determining acetic acid in the outflowing solvent. After cooling, n-butanol and xylene were added thereto, so as to provide a hydrolyzable polymer solution (A-4) containing a hydrolyzable polymer, having a solid content of 51.4%, a viscosity at 25° C. of 182 mPa·s, and a zinc content in the hydrolyzable polymer solution of 4.0% by mass (a zinc content in the hydrolyzable polymer of 7.8% by mass). The hydrolyzable polymer in the hydrolyzable polymer solution (A-4) had a number average molecular weight (Mn) of 960 and a weight average molecular weight (Mw) of 4,700.

The measurement methods for the characteristic values of the resulting hydrolyzable polymer solutions (A-1) to (A-4) were as follows.

<Viscosity of Hydrolyzable Polymer Solution>

The viscosity of the hydrolyzable polymer solution at 25° C. was measured with an E-type viscometer (produced by Toki Sangyo Co., Ltd.).

<Zinc Content of Hydrolyzable Polymer Solution>

The zinc content of the hydrolyzable polymer solution was measured with an X-ray diffractometer (Horizontal sample mount multi-purpose X-ray diffractometer Ultima IV, produced by Rigaku Corporation).

The zinc content of the hydrolyzable polymer was calculated from the measured zinc content of the hydrolyzable polymer solution and the measured solid content of the hydrolyzable polymer solution, and shown in Table 1. For Production Example 4, the zinc content of the hydrolyzable polymer was calculated and shown in the production example.

<Number Average Molecular Weight (Mn) and Weight Average Molecular Weight (Mw) of Hydrolyzable Polymer>

The number average molecular weight (Mn) and the weight average molecular weight (Mw) of the hydrolyzable polymer were measured by GPC (gel permeation chromatography) under the following condition.

GPC Condition

Equipment: "HLC-8320GPC" (produced by Tosoh Corporation)

Columns: "TSKgel Super AWM-H"×2 and "TSKgel Super AW2500"×1 connected (all produced by Tosoh Corporation, inner diameter: 6 mm, length: 15 cm)

Eluent: N,N-dimethylformamide (DMF) (20 mM lithium bromide added)

Flow rate: 0.600 mL/min

Detector: RI

Column thermostat chamber temperature: 40° C.

Standard substance: polystyrene

Preparation method of specimen: The polymer solutions prepared in Production Examples each were dehydrated by adding a small amount of calcium chloride, and then filtered with a membrane filter to provide a filtrate, which was designated as a specimen for the GPC measurement.

<Solid Content>

In the present invention, the solid content means a heating residue obtained by drying a mixture, composition or the like containing a solvent and the like in a hot air dryer at 108° C. for 3 hours, so as to evaporate the solvent and the like.

Examples 1 to 16 and Comparative Examples 1 to 3: Production of Antifouling Coating Composition Antifouling coating compositions were produced by uniformly mixing the hydrolyzable polymer compositions obtained in the production examples, the zinc oxide (B), the medetomidine (C), and the other components as shown in Tables 2 and 3 below (the numerals in the tables are in terms of part by mass) with a paint shaker under ordinary temperature.

The blending amounts shown in Tables 2 and 3 each are shown in terms of blending amount of the solution or the dispersion liquid for the component with the solid content described, and shown in terms of solid content for the component with no solid content described (except for the organic solvents).

<Evaluation>

The resulting antifouling coating compositions were subjected to the following evaluation.

[Antifouling Performance Accelerated Test]

On a sand-blasted panel of 70×200×3 mm having been bent to enable mounting on a side wall of a rotational drum disposed in a test raft moored in Kure Bay, Hiroshima Prefecture, an epoxy-based anti-corrosive paint (Epoxy AC Paint, "Bannoh 500", a trade name, produced by Chugoku Marine Paints, Ltd.) was applied to a dry thickness of approximately 150 Gm, and then an epoxy-based binder paint ("Bannoh 500N", a trade name, produced by Chugoku Marine Paints, Ltd.) was applied thereon to a dry thickness of approximately 100 μm. Further thereon, the antifouling coating compositions of the examples and the comparative examples each were applied to a dry thickness of approximately 150 μm twice, and dried at room temperature for 7 days, so as to produce test panels having an antifouling coating film. The aforementioned four coating operations were performed once per day.

For confirming the long-term antifouling performance, the test panel mounted on the rotational drum was immersed for 12 months under a 100% operation condition with a circumferential velocity of 15 knot, which assumed an actual operation of a ship, for aging the coating film, and after detaching from the rotational drum, the test panel was further statically immersed vertically in Hiroshima Bay at a water depth of 1.5 m for 6 months, and measured every two months for the adhesion area (%) of marine organisms except for slime of the surface of the antifouling coating composition. The static antifouling performance of the antifouling coating film was evaluated by the following evaluation standard.

[Static Antifouling Performance Test]

On a sand-blasted steel panel (300 mm in length×100 mm in width×3.2 mm in thickness), an epoxy-based anti-corrosive paint (Epoxy AC Paint, "Bannoh 500", a trade name, produced by Chugoku Marine Paints, Ltd.) was applied to a dry thickness of approximately 150 μm, and then an epoxy-based binder paint ("Bannoh 500N", a trade name, produced by Chugoku Marine Paints, Ltd.) was applied thereon to a dry thickness of approximately 100 μm. Further thereon, the antifouling coating compositions of the examples and the comparative examples each were applied to a dry thickness of approximately 100 μm once, and dried at room temperature for 7 days, so as to produce test panels having an antifouling coating film. The aforementioned three coating operations were performed once per day.

The test panel produced above was statically immersed vertically in Hiroshima Bay, Hiroshima Prefecture, at a water depth of 1.5 m for 18 months, and measured every three months for the adhesion area (%) of only barnacles and the adhesion area (%) of barnacles and other marine organisms, such as algae, on the surface of the antifouling coating film. The static antifouling performance of the antifouling coating film was evaluated by the following evaluation standard.

Evaluation Standard for Static Antifouling Performance by Adhesion Area of Marine Organisms 0: No marine organism adhered.

0.5: The adhesion area of marine organisms was more than 0% and 10% or less.

1: The adhesion area of marine organisms was more than 10% and 20% or less.

2: The adhesion area of marine organisms was more than 20% and 30% or less.

3: The adhesion area of marine organisms was more than 30% and 40% or less.

4: The adhesion area of marine organisms was more than 40% and 50% or less.

5: The adhesion area of marine organisms was more than 50%.

[Damage Resistance of Antifouling Coating Film]

On a sand-blasted steel panel of 70×150×1.6 mm, an epoxy-based anti-corrosive paint (Epoxy AC Paint, "Bannoh 500", a trade name, produced by Chugoku Marine Paints, Ltd.) was applied to a dry thickness of approximately 150 μm, an epoxy-based binder paint ("Bannoh 500N", a trade name, produced by Chugoku Marine Paints, Ltd.) was applied to a dry thickness of approximately 100 μm, and the antifouling coating compositions of the examples and the comparative examples each were applied by air spraying to a dry thickness of approximately 150 μm, every other days, so as to produce a test panel having a layered antifouling coating film. After one day, three days, and five days from the completion of the application of the antifouling coating film at a drying temperature of 23° C., a wood piece of 30×30×10 mm placed on the center portion of the antifouling coating film was applied with a pressure of 40 kgf/cm² (3.9 MPa) in the vertical direction for 20 minutes, and the state of the surface of the coating film was observed (i.e., measured for the deformation degree of the coating film) and evaluated based on the following evaluation standard. FIG. 1 is a schematic illustration of the cross sectional views of the coating films for each grade of the evaluation.

5: No deformation of the coating film was observed with the best condition.

4: Slight deformation of the coating film was observed with good condition.

3, 2, and 1: Significant deformation was observed with exposure of the steel panel found partially.

The extent of damage (deformation) is increased in the order of 3, 2, and 1.

The formulation of coating composition and the results of the antifouling performance accelerated test, the static antifouling performance test, and the damage resistance of the antifouling coating film are shown in Tables 2 and 3.

TABLE 2

|  |  | Example | | | | | | | | | |
|---|---|---|---|---|---|---|---|---|---|---|---|
|  |  | 1 | 2 | 3 | 4 | 5 | 6 | 7 | 8 | 9 | 10 |
|  | No. of coating composition | 1-1 | 1-2 | 1-3 | 1-4 | 1-5 | 1-6 | 1-7 | 1-8 | 1-9 | 1-10 |
| (A) | Hydrolyzable polymer solution (A-1) (solid content: 46.5%) | 42 | 0 | 0 | 0 | 0 | 0 | 0 | 0 | 0 | 0 |

TABLE 2-continued

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| | | Hydrolyzable polymer solution (A-2) (solid content: 46.4%) | 0 | 42 | 0 | 0 | 42 | 42 | 42 | 42 | 42 | 42 |
| | | Hydrolyzable polymer solution (A-3) (solid content: 45.0%) | 0 | 0 | 42 | 0 | 0 | 0 | 0 | 0 | 0 | 0 |
| | | Hydrolyzable polymer solution (A-4) (solid content: 51.4%) | 0 | 0 | 0 | 42 | 0 | 0 | 0 | 0 | 0 | 0 |
| (B) | | Zinc oxide | 25 | 25 | 25 | 25 | 30 | 35 | 20 | 17 | 25 | 25 |
| (C) | | Medetomidine | 0.1 | 0.1 | 0.1 | 0.1 | 0.1 | 0.1 | 0.1 | 0.1 | 0.1 | 0.05 |
| (D) | | Copper pyrithione | 5 | 5 | 5 | 5 | 5 | 5 | 5 | 5 | 10 | 5 |
| | | Zinc pyrithione | 0 | 0 | 0 | 0 | 0 | 0 | 0 | 0 | 0 | 0 |
| | | Tralopyril | 0 | 0 | 0 | 0 | 0 | 0 | 0 | 0 | 0 | 0 |
| | | Pyridine triphenyl borane | 0 | 0 | 0 | 0 | 0 | 0 | 0 | 0 | 0 | 0 |
| | | DCOIT (solid content: 30%) | 0 | 0 | 0 | 0 | 0 | 0 | 0 | 0 | 0 | 0 |
| (F) | | Versatic acid | 0 | 0 | 0 | 0 | 0 | 0 | 0 | 0 | 0 | 0 |
| (H) | | Red iron oxide | 2 | 2 | 2 | 2 | 2 | 2 | 2 | 2 | 2 | 2 |
| (I) | | Precipitated barium sulfate | 3 | 3 | 3 | 3 | 3 | 3 | 3 | 6 | 3 | 3 |
| | | Talc | 8 | 8 | 8 | 8 | 5 | 0 | 8 | 8 | 3 | 8 |
| (L) | | Fatty acid amide wax (solid content: 20%) | 2.5 | 2.5 | 2.5 | 2.5 | 2.5 | 2.5 | 2.5 | 2.5 | 2.5 | 2.5 |
| (M) | | Oxidized polyethylene wax (solid content: 20%) | 2 | 2 | 2 | 2 | 2 | 2 | 2 | 2 | 2 | 2 |
| (N) | | Calcined gypsum | 1 | 1 | 1 | 1 | 1 | 1 | 1 | 1 | 1 | 1 |
| (O) | | Xylene | 5.4 | 5.4 | 5.4 | 5.4 | 3.4 | 3.4 | 10.4 | 10.4 | 5.4 | 5.45 |
| | | Propylene glycol monomethyl ether | 3 | 3 | 3 | 3 | 3 | 3 | 3 | 3 | 3 | 3 |
| (P) | | Chlorinated paraffin | 1 | 1 | 1 | 1 | 1 | 1 | 1 | 1 | 1 | 1 |
| | | Total | 100 | 100 | 100 | 100 | 100 | 100 | 100 | 100 | 100 | 100 |
| | ZnO in part by weight per 100 parts by weight of solid content of coating composition | | 38.2 | 38.2 | 38.5 | 37.0 | 44.5 | 51.9 | 33.1 | 28.1 | 38.2 | 38.2 |
| Antifouling | Adhesion area of | 2 months | 0 | 0 | 0 | 0 | 0 | 0 | 0 | 0 | 0 | 0 |
| performance | barnacles | 4 months | 0 | 0 | 0 | 0 | 0 | 0 | 0 | 0 | 0 | 0 |
| accelerated | | 6 months | 0 | 0 | 0 | 0 | 0 | 0 | 0 | 0.5 | 0 | 0.5 |
| test | Adhesion area of | 2 months | 0 | 0 | 0 | 0 | 0 | 0 | 0 | 0 | 0 | 0 |
| | barnacles and other | 4 months | 0 | 0 | 0 | 0 | 0 | 0 | 0 | 0.5 | 0 | 0 |
| | marine organisms | 6 months | 0 | 0 | 0 | 0 | 0 | 0 | 0 | 0.5 | 0 | 0.5 |
| Static | Adhesion area of | 3 months | 0 | 0 | 0 | 0 | 0 | 0 | 0 | 0 | 0 | 0 |
| antifouling | barnacles | 6 months | 0 | 0 | 0 | 0 | 0 | 0 | 0 | 0 | 0 | 0 |
| performance | | 9 months | 0 | 0 | 0 | 0 | 0 | 0 | 0 | 0 | 0 | 0 |
| test | | 12 months | 0 | 0 | 0 | 0 | 0 | 0 | 0 | 0 | 0 | 0 |
| | | 15 months | 0 | 0 | 0 | 0 | 0 | 0 | 0 | 0 | 0 | 0 |
| | | 18 months | 0 | 0 | 0 | 0 | 0 | 0 | 0 | 0 | 0 | 0 |
| | Adhesion area of | 3 months | 0 | 0 | 0 | 0 | 0 | 0 | 0 | 0 | 0 | 0 |
| | barnacles and other | 6 months | 0 | 0 | 0 | 0 | 0 | 0 | 0 | 0 | 0 | 0 |
| | marine organisms | 9 months | 0 | 0 | 0 | 0 | 0 | 0 | 0 | 0 | 0 | 0 |
| | | 12 months | 0 | 0 | 0 | 0 | 0 | 0 | 0 | 0 | 0 | 0 |
| | | 15 months | 0 | 0 | 0 | 0 | 0 | 0 | 0 | 0 | 0 | 0 |
| | | 18 months | 0 | 0 | 0 | 0 | 0 | 0 | 0 | 0.5 | 0 | 0.5 |
| Damage resistance of antifouling film | | drying for 1 day | 3 | 3 | 3 | 3 | 4 | 4 | 3 | 3 | 3 | 3 |
| | | drying for 3 days | 5 | 5 | 5 | 5 | 5 | 5 | 5 | 5 | 5 | 5 |
| | | drying for 5 days | 5 | 5 | 5 | 5 | 5 | 5 | 5 | 5 | 5 | 5 |

TABLE 3

| | | | Example | | | | | | Comparative Example | | |
|---|---|---|---|---|---|---|---|---|---|---|---|
| | | | 11 | 12 | 13 | 14 | 15 | 16 | 1 | 2 | 3 |
| | | No. of coating composition | 1-11 | 1-12 | 1-13 | 1-14 | 1-15 | 1-16 | 2-1 | 2-2 | 2-3 |
| (A) | | Hydrolyzable polymer solution (A-1) (solid content: 46.5%) | 0 | 0 | 0 | 0 | 0 | 0 | 0 | 0 | 0 |
| | | Hydrolyzable polymer solution (A-2) (solid content: 46.4%) | 42 | 42 | 42 | 42 | 42 | 42 | 42 | 42 | 42 |
| | | Hydrolyzable polymer solution (A-3) (solid content: 45.0%) | 0 | 0 | 0 | 0 | 0 | 0 | 0 | 0 | 0 |
| | | Hydrolyzable polymer solution (A-4) (solid content: 51.4%) | 0 | 0 | 0 | 0 | 0 | 0 | 0 | 0 | 0 |
| (B) | | Zinc oxide | 25 | 25 | 25 | 25 | 25 | 25 | 10 | 53 | 25 |
| (C) | | Medetomidine | 0.4 | 0.1 | 0.1 | 0.1 | 0.1 | 0.1 | 0.1 | 0.1 | 0 |
| (D) | | Copper pyrithione | 5 | 0 | 0 | 0 | 0 | 5 | 0 | 0 | 0 |
| | | Zinc pyrithione | 0 | 5 | 0 | 0 | 0 | 0 | 5 | 5 | 5 |
| | | Tralopyril | 0 | 0 | 5 | 0 | 0 | 0 | 0 | 0 | 0 |
| | | Pyridine triphenyl borane | 0 | 0 | 0 | 5 | 0 | 0 | 0 | 0 | 0 |
| | | DCOIT (solid content: 30%) | 0 | 0 | 0 | 0 | 5 | 0 | 0 | 0 | 0 |

TABLE 3-continued

|  |  |  | Example |  |  |  |  |  | Comparative Example |  |  |
|---|---|---|---|---|---|---|---|---|---|---|---|
|  |  |  | 11 | 12 | 13 | 14 | 15 | 16 | 1 | 2 | 3 |
| (F) |  | Versatic acid | 0 | 0 | 0 | 0 | 0 | 0.5 | 0 | 0 | 0 |
| (H) |  | Red iron oxide | 2 | 2 | 2 | 2 | 2 | 2 | 2 | 2 | 2 |
| (I) |  | Precipitated barium sulfate | 3 | 3 | 3 | 3 | 3 | 3 | 3 | 3 | 3 |
|  |  | Talc | 8 | 8 | 8 | 8 | 8 | 8 | 23 | 0 | 8 |
| (L) |  | Fatty acid amide wax (solid content: 20%) | 2.5 | 2.5 | 2.5 | 2.5 | 2.5 | 2.5 | 2.5 | 2.5 | 2.5 |
| (M) |  | Oxidized polyethylene wax (solid content: 20%) | 2 | 2 | 2 | 2 | 2 | 2 | 2 | 2 | 2 |
| (N) |  | Calcined gypsum | 1 | 1 | 1 | 1 | 1 | 1 | 1 | 1 | 1 |
| (O) |  | Xylene | 5.1 | 5.4 | 5.4 | 5.4 | 5.4 | 4.9 | 5.4 | 5.4 | 5.5 |
|  |  | Propylene glycol monomethyl ether | 3 | 3 | 3 | 3 | 3 | 3 | 3 | 3 | 3 |
| (P) |  | Chlorinated paraffin | 1 | 1 | 1 | 1 | 1 | 1 | 1 | 1 | 1 |
|  |  | Total | 100 | 100 | 100 | 100 | 100 | 100 | 100 | 120 | 100 |
| ZnO in part by weight per 100 parts by weight of solid content of coating composition |  |  | 38.0 | 38.2 | 38.2 | 38.2 | 40.3 | 37.9 | 15.3 | 62.0 | 38.2 |
| Antifouling performance accelerated test | Adhesion area of barnacles | 2 months | 0 | 0 | 0 | 0 | 0 | 0 | 0 | 1* | 0.5 |
|  |  | 4 months | 0 | 0 | 0 | 0 | 0 | 0 | 2 | 2* | 1 |
|  |  | 6 months | 0 | 0 | 0 | 0 | 0 | 0 | 3 | 5* | 4 |
|  | Adhesion area of barnacles and other marine organisms | 2 months | 0 | 0 | 0 | 0 | 0 | 0 | 0.5 | 1* | 0.5 |
|  |  | 4 months | 0 | 0 | 0 | 0 | 0 | 0 | 3 | 3* | 3 |
|  |  | 6 months | 0 | 0 | 0 | 0 | 0 | 0 | 5 | 5* | 5 |
| Static antifouling performance test | Adhesion area of barnacles | 3 months | 0 | 0 | 0 | 0 | 0 | 0 | 0 | 0* | 0 |
|  |  | 6 months | 0 | 0 | 0 | 0 | 0 | 0 | 0 | 0.5* | 0.5 |
|  |  | 9 months | 0 | 0 | 0 | 0 | 0 | 0 | 0 | 1* | 1 |
|  |  | 12 months | 0 | 0 | 0 | 0 | 0 | 0 | 0.5 | 3* | 3 |
|  |  | 15 months | 0 | 0 | 0 | 0 | 0 | 0 | 1 | 3* | 4 |
|  |  | 18 months | 0 | 0 | 0 | 0 | 0 | 0 | 2 | 4* | 4 |
|  | Adhesion area of barnacles and other marine organisms | 3 months | 0 | 0 | 0 | 0 | 0 | 0 | 0 | 0* | 0 |
|  |  | 6 months | 0 | 0 | 0 | 0 | 0 | 0 | 0.5 | 0.5* | 0.5 |
|  |  | 9 months | 0 | 0 | 0 | 0 | 0 | 0 | 1 | 1* | 1 |
|  |  | 12 months | 0 | 0 | 0 | 0 | 0 | 0 | 2 | 4* | 3 |
|  |  | 15 months | 0 | 0 | 0 | 0 | 0 | 0 | 5 | 5* | 5 |
|  |  | 18 months | 0 | 0 | 0 | 0 | 0 | 0 | 5 | 5* | 5 |
| Damage resistance of antifouling film | | drying for 1 day | 3 | 3 | 2 | 3 | 2 | 3 | 2 | 4 | 3 |
|  |  | drying for 3 days | 5 | 5 | 4 | 4 | 3 | 5 | 3 | 5 | 5 |
|  |  | drying for 5 days | 5 | 5 | 5 | 5 | 5 | 5 | 4 | 5 | 5 |

*Cracks occurred.

The components in Tables 2 and 3 are shown in Table 4 below.

TABLE 4

|  | Name of component | Name of product | Manufacturer | Solid content |
|---|---|---|---|---|
| (B) | zinc oxide | Zinc Oxide Class 3 | Hakusuitech Co., Ltd. | 100 |
| (C) | medetomidine | Selektope | I-tech AB | 100 |
| (D) | copper pyrithione | Copper Omadine Powder | Arch UK Biocides, Ltd | 100 |
| (D) | zinc pyrithione | Zinc Omadine Powder | Arch UK Biocides, Ltd | 100 |
| (D) | tralopyril (4-bromo-2-(4-chlorophenyl)-5-(trifluoromethyl)-1H-pyrrole-3-carbonitrile) | ECONEA TECHNICAL | Janssen Pharmaceutica NV | 100 |
| (D) | pyridine triphenyl borane | PK | Hokko Chemical Industry Co., Ltd. | 100 |
| (D) | DCOIT (4,5-dichloro-2-n-octyl-4-isothiazolin-3-one) | SEA NINE 211 | Rohm and Haas Japan K.K. | 30 |
| (F) | versatic acid | Versatic 10 | Japan Epoxy Resin Co., Ltd. | 100 |
| (H) | Red iron oxide | Bengara 404 | Morishita Bengara Kogyo Co., Ltd. | 100 |
| (I) | precipitated barium sulfate | Precipitated Barium Sulfate 100 | Sakai Chemical Industry Co., Ltd. | 100 |
| (I) | talc | TTK Talc | Takehara Kagaku Kogyo Co., Ltd. | 100 |
| (L) | fatty acid amide wax (solid content: 20%) | Disperlon A630-20X | Kusumoto Chemicals, Ltd. | 20 |
| (M) | oxidized polyethylene wax (solid content: 20%) | Disperlon D4200-20X | Kusumoto Chemicals, Ltd. | 20 |
| (N) | calcined gypsum | FT-2 | Noritake Co., Ltd. | 100 |
| (P) | chlorinated paraffin | Toyoparax 150 chlorination degree: 50% viscosity: 1000 to 2000 mPa·s | Tohoku Tosoh Chemical Co., Ltd. | 100 |

It is apparent from the results of Examples and Comparative Examples that according to the antifouling coating composition of the present invention, an antifouling coating film that retains a high antifouling performance for a prolonged period of time and has an excellent damage resistance can be provided.

The invention claimed is:

1. An antifouling coating composition comprising:
a hydrolyzable polymer (A) comprising a metal ester group,
zinc oxide (B),
medetomidine (C), and
an organic antifouling agent (D); and
having a content of the zinc oxide (B) in a solid content of the antifouling coating composition of 27 to 51.9% by mass,
having a content of medetomidine (C) in a solid content of the antifouling coating composition of 0.07 to 0.61% by mass,
having a content of the organic antifouling agent (D) in a solid content of the antifouling coating composition of 7.4 to 15.3% by mass, and
wherein the hydrolyzable polymer (A) comprises at least one selected from the group consisting of a polymer (A1') having a constituent unit derived from a polymerizable compound represented by the following formula (1-1') and a polymer (A2') having a constituent unit derived from a polymerizable compound represented by the following formula (1-2'):

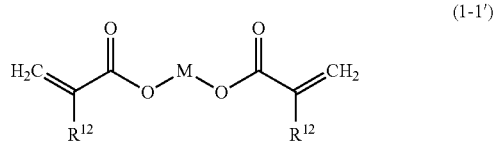

(1-1')

wherein $R^{12}$ each independently represent a hydrogen atom or a methyl group; and M represents copper or zinc,

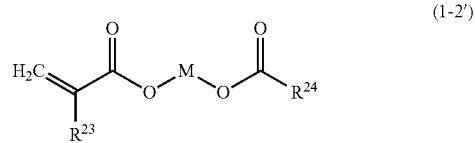

(1-2')

wherein $R^{23}$ represents a hydrogen atom or a methyl group; $R^{24}$ represents a monovalent organic group having 1 to 30 carbon atoms containing no terminal ethylenically unsaturated group; and M represents copper or zinc, and
wherein the organic antifouling agent (D) is a copper pyrithione.

2. The antifouling coating composition according to claim 1, which has a content of cuprous oxide (E) in a solid content of the antifouling coating composition of 0.5% by mass or less.

3. The antifouling coating composition according to claim 1, further comprising at least one selected from the group consisting of a monocarboxylic acid compound (F) and/or a metal ester thereof, an inorganic copper compound (G) except for cuprous oxide, an organic antifouling agent except for a copper pyrithione and a zinc pyrithione as an organic antifouling agent (D), a coloring pigment (H), an extender pigment (I), a pigment dispersant (J), a plasticizer (K), an anti-sagging agent (L), an anti-settling agent (M), a dehydrating agent (N), a solvent (O), and a resin (P).

4. An antifouling coating film, which is formed with the antifouling coating composition according to claim 1.

5. A substrate with an antifouling coating film, the substrate being coated with the antifouling coating film according to claim 4.

6. The substrate with an antifouling coating film according to claim 5, wherein the substrate is selected from the group consisting of a ship, an underwater structure, and a fishing gear.

7. An antifouling method comprising employing the antifouling coating film according to claim 4.

8. A method for producing a substrate with an antifouling coating film, comprising:
(I) providing an applied material or an impregnated material by applying the antifouling coating composition according to claim 1 on a substrate or impregnating a substrate with the antifouling coating composition; and
(II) drying the applied material or the impregnated material.

9. A method for producing a substrate with an antifouling coating film, comprising:
(i) forming an antifouling coating film by drying the antifouling coating composition according to claim 1; and
(ii) attaching the antifouling coating film to a substrate.

10. The antifouling coating composition according to claim 1, which has a content of cuprous oxide (E) in a solid content of the antifouling coating composition of 1% by mass or less.

11. The antifouling coating composition according to claim 1, wherein the hydrolyzable polymer (A) comprises a constituent unit derived from the other monomer (a2) comprising an alkyl (meth)acrylate, and a content of an alkyl (meth)acrylate in the monomer (a2) is 70% by mass or more.

12. The antifouling coating composition according to claim 1, wherein an adhesion area of marine organisms in a substrate being coated with an antifouling coating film, which is formed of the antifouling coating composition, is not more than 10% after the substrate is immersed in the sea for 6 months.

13. The antifouling coating composition according to claim 1, having a content of medetomidine (C) in a solid content of the antifouling coating composition of 0.08 to 0.61% by mass.

* * * * *